US010489384B2

(12) United States Patent
Gould et al.

(10) Patent No.: US 10,489,384 B2
(45) Date of Patent: Nov. 26, 2019

(54) SYSTEMS AND METHODS FOR DETERMINING RELATIONSHIPS AMONG DATA ELEMENTS

(71) Applicant: Ab Initio Technology LLC, Lexington, MA (US)

(72) Inventors: Joel Gould, Arlington, MA (US); Dusan Radivojevic, North Andover, MA (US)

(73) Assignee: Ab Initio Technology LLC, Lexington, MA (US)

( * ) Notice: Subject to any disclaimer, the term of this patent is extended or adjusted under 35 U.S.C. 154(b) by 197 days.

(21) Appl. No.: 15/807,897

(22) Filed: Nov. 9, 2017

(65) Prior Publication Data
US 2018/0129699 A1 May 10, 2018

Related U.S. Application Data

(60) Provisional application No. 62/419,826, filed on Nov. 9, 2016.

(51) Int. Cl.
*G06F 16/23* (2019.01)
*G06F 16/28* (2019.01)
(Continued)

(52) U.S. Cl.
CPC ...... *G06F 16/2365* (2019.01); *G06F 11/3604* (2013.01); *G06F 16/288* (2019.01); *G06F 16/9024* (2019.01)

(58) Field of Classification Search
CPC ............ G06F 16/2365; G06F 16/9024; G06F 16/288; G06F 11/3604
(Continued)

(56) References Cited

U.S. PATENT DOCUMENTS 5,966,072 A 10/1999 Stanfill et al.
6,343,295 B1 * 1/2002 MacLeod .............. G06F 16/219
(Continued)

OTHER PUBLICATIONS

Tomingas, Kalle, et al., "Automating Component Dependency Analysis for Enterprise Business Intelligence", Thirty-Fifth International Conference on Information Systems, Auckland, New Zealand, 2014, 15 pages.*
(Continued)

*Primary Examiner* — Robert Stevens
(74) *Attorney, Agent, or Firm* — Wolf, Greenfield & Sacks, P.C.

(57) ABSTRACT

A data processing system configured to perform: obtaining a first data lineage representing relationships among physical data elements, the first data lineage being generated at least in part by performing at least one of: (a) analyzing source code of at least one computer program configured to access the physical data elements; and (b) analyzing information obtained during runtime of the at least one computer program; obtaining, based on user input, a second data lineage representing relationships among business data elements; obtaining an association between at least some of the physical data elements of the first data lineage and at least some of the business data elements of the second data lineage; and generating, based on the association between the physical data elements and the business data elements, an indication of agreement or discrepancy between the first data lineage and the second data lineage.

26 Claims, 21 Drawing Sheets

(51) Int. Cl.
*G06F 11/36* (2006.01)
*G06F 16/901* (2019.01)

(58) Field of Classification Search
USPC .......................................................... 707/690
See application file for complete search history.

(56) References Cited

U.S. PATENT DOCUMENTS

| | | | |
|---|---|---|---|
| 6,434,558 B1* | 8/2002 | MacLeod | G06F 16/284 |
| 7,117,219 B1* | 10/2006 | Powers | G06Q 40/00 |
| | | | 707/603 |
| 7,493,570 B2* | 2/2009 | Bobbin | G06F 3/04842 |
| | | | 715/800 |
| 7,725,433 B1* | 5/2010 | Labrie | G06F 16/213 |
| | | | 707/612 |
| 7,783,650 B2* | 8/2010 | Powers | G06Q 40/00 |
| | | | 707/756 |
| 9,063,988 B2* | 6/2015 | Justice | G06F 16/2477 |
| 9,348,879 B2* | 5/2016 | Mohammad | G06Q 10/063 |
| 9,514,203 B2* | 12/2016 | Mohammad | G06Q 10/063 |
| 9,659,042 B2* | 5/2017 | Puri | G06F 16/219 |
| 9,811,573 B1* | 11/2017 | Xiang | G06F 16/26 |
| 10,025,878 B1* | 7/2018 | Lefever | G06F 16/9024 |
| 2002/0055932 A1* | 5/2002 | Wheeler | G06F 16/25 |
| 2006/0064666 A1* | 3/2006 | Amaru | G06F 16/25 |
| | | | 717/100 |
| 2007/0011668 A1 | 1/2007 | Wholey et al. | |
| 2010/0138431 A1* | 6/2010 | Bator | G06F 16/26 |
| | | | 707/755 |
| 2014/0019423 A1* | 1/2014 | Liensberger | G06F 16/219 |
| | | | 707/690 |
| 2014/0108357 A1 | 4/2014 | Procops et al. | |
| 2014/0279979 A1* | 9/2014 | Yost | G06F 16/904 |
| | | | 707/695 |
| 2015/0012314 A1* | 1/2015 | Mohammad | G06Q 10/063 |
| | | | 705/7.11 |
| 2015/0012477 A1* | 1/2015 | Mohammad | G06Q 10/063 |
| | | | 707/602 |
| 2015/0012478 A1 | 1/2015 | Mohammad et al. | |
| 2015/0310055 A1 | 10/2015 | Derstadt | |
| 2016/0019057 A1 | 1/2016 | Bach et al. | |
| 2016/0019286 A1 | 1/2016 | Bach et al. | |
| 2016/0028580 A1 | 1/2016 | Radivojevic et al. | |
| 2016/0232230 A1 | 8/2016 | Radivojevic | |
| 2017/0270022 A1* | 9/2017 | Moresmau | G06F 11/3466 |
| 2018/0004781 A1* | 1/2018 | Mukherjee | G06F 16/214 |

OTHER PUBLICATIONS

Invitation to Pay Additional Fees for Application No. PCT/US2017/060860 dated Feb. 1, 2018, 15 pages.
International Search Report and Written Opinion for Application No. PCT/US2017/060860 dated Apr. 6, 2018, 19 pages.

* cited by examiner

| Business Data Element: Credit Score | | | | | Status: ✓ Approved |
|---|---|---|---|---|---|
| ⓘ Info | Feeds | | | | |
| ○ Relationships | US Origination Systems | | | | |
| ⋎ Lineage | CN Origination Systems | | | | |
| ☒ Notes | | | | | |
| ⊙ Versions | | | | | |

650

Source Systems

✎ Edit

Comes from Authoritative Sources: (Unspecified)

ⓘ | 🗎 ፨ ⊦σ

| System | Is Authoritative | Derived Source? | Stated Source? | Stated By | Stated On | Approved On |
|---|---|---|---|---|---|---|
| External Data | Yes | ✓ | | | | |
| US Origination Systems | Yes | | ✓ | Rosa S. Todd | 2015/04/15 | Lisa D. Cadotte |

SYSTEMS AND METHODS FOR DETERMINING RELATIONSHIPS AMONG DATA ELEMENTS

CROSS-REFERENCE TO RELATED APPLICATIONS

This application claims the benefit under 35 U.S.C. § 119(e) of U.S. Provisional Application Ser. No. 62/419,826, titled "SYSTEMS AND METHODS FOR DETERMINING RELATIONSHIPS AMONG DATA ELEMENTS", filed on Nov. 9, 2016, which is incorporated by reference herein in its entirety.

BACKGROUND

Organizations that manage large amounts of data often wish to obtain data lineage for at least some of the data being managed. Data lineage for a set of data being managed may include information indicating how the set of data was obtained, how the set of data may change over time, and/or how the set of data may be used by one or more data processing systems and/or processes. Data lineage for a set of data may include upstream lineage information indicating how the set of data was obtained. For example, upstream lineage information may identify one or more data sources from which the set of data was obtained and/or one or more data processing operations that have been applied to the set of data. Additionally or alternatively, data lineage for a set of data may include downstream lineage information indicating one or more other datasets, processes, and/or applications that depend and/or use the set of data. An organization may wish to obtain lineage information for any suitable set of data such as, for example, one or more data records, one or more tables of data in a database, one or more spreadsheets of data, one or more files of data, a single data value, data used to produce one or more reports, data accessed by one or more application programs, and/or any other suitable set of data.

There are many uses of lineage information about the data managed by an organization's data processing systems. Examples of such uses include, but are not limited to, risk reduction, verification of regulatory compliance obligations, streamlining of business processes, safeguarding data, tracing errors back to their sources, and determining whether changes to data may lead to downstream errors. In some cases, incomplete or incorrect lineage information can lead to negative practical effects on the organization, such as records being handled incorrectly, inaccurate data being provided to members of the organization, inefficient system operation, system failures, inadvertent introduction of errors, inefficient resolution of errors, difficulty complying with regulatory processes, etc. For a business organization, such effects can quickly lead to customer and/or regulator dissatisfaction. Accordingly, it is important that lineage information is both correct and complete.

SUMMARY

Some embodiments are directed to a data processing system, comprising: at least one computer hardware processor; and at least one non-transitory computer-readable storage medium storing processor-executable instructions that, when executed by the at least one computer hardware processor, cause the at least one computer hardware processor to perform: obtaining a first data lineage representing relationships among a plurality of physical data elements, the first data lineage being generated at least in part by performing at least one of: (a) analyzing source code of at least one computer program configured to access at least some of the plurality of physical data elements; and (b) analyzing information obtained during runtime of the at least one computer program; obtaining, based at least in part on user input, a second data lineage representing relationships among a plurality of business data elements; obtaining an association between at least some of the plurality of physical data elements of the first data lineage and at least some of the plurality of business data elements of the second data lineage; and generating, based on the association between the plurality of physical data elements and the plurality of business data elements, an indication of agreement or discrepancy between the first data lineage and the second data lineage.

In some embodiments, generating the indication of agreement or discrepancy comprises: displaying a visualization of the second data lineage showing the indication of agreement or discrepancy.

In some embodiments including any of the preceding embodiments, the second data lineage comprises a first link representing a first dependency between two business data elements, and wherein displaying the visualization of the second data lineage comprises displaying the link in one manner when there is a dependency in the first data lineage corresponding to the first dependency and in another manner when there is not a dependency in the first data lineage corresponding to the first dependency.

In some embodiments including any of the preceding embodiments, generating the indication of agreement or discrepancy comprises: determining, based on the association between the plurality of physical data elements and the plurality of business data elements, whether there is one or more discrepancies among the first data lineage, the second data lineage, and the obtained association.

In some embodiments including any of the preceding embodiments, obtaining the first data lineage comprises generating the first data lineage at least in part by performing at least one of analyzing the source code of the at least one computer program and analyzing the information obtained during runtime of the at least one computer program.

In some embodiments including any of the preceding embodiments, obtaining the first data lineage comprises analyzing the source code of the at least one computer program.

In some embodiments, obtaining the first data lineage comprises analyzing the information obtained during runtime of the at least one computer program.

In some embodiments including any of the preceding embodiments, the at least one computer program comprises a computer program implemented as a dataflow graph.

In some embodiments including any of the preceding embodiments, obtaining the association between the at least some of the plurality of physical data elements of the first data lineage and the at least some of the plurality of business data elements of the second data lineage comprises generating the association based on user input provided via a graphical user interface.

In some embodiments including any of the preceding embodiments, the plurality of physical data elements comprises a first physical data element, the plurality of business data elements comprises a first business data element, the association indicates that the first physical data element and the first business data element are associated, and the determining comprises determining that a first set of one or more sources of data identified in the first data lineage as being used to obtain the first physical data element is different from a second set of one or more sources of data identified in the second data lineage as being used to obtain the first business data element.

In some embodiments including any of the preceding embodiments, the acts of obtaining the first data lineage and determining whether there is a discrepancy are performed repeatedly according to a specified schedule.

In some embodiments including any of the preceding embodiments, the association comprises an association between a first physical data element of the plurality of physical data elements and a first business data element of the plurality of business data elements, and the at least one computer hardware processor is further configured to perform: determining, based at least in part on the association between the first physical data element and the first business data element, a measure of data quality for the first business data element.

In some embodiments including any of the preceding embodiments, determining the measure of data quality for the first business data element comprises: performing an analysis of data quality of data in the first physical data element based at least in part on one or more data quality rules associated with the data in the first physical data element.

In some embodiments including any of the preceding embodiments, the measure of data quality for the first business element includes a measure of one or more of accuracy, completeness, and validity.

Some embodiments are directed to a method, comprising: using at least one computer hardware processor to perform: obtaining a first data lineage representing relationships among a plurality of physical data elements, the first data lineage being generated at least in part by performing at least one of: (a) analyzing source code of at least one computer program configured to access at least some of the plurality of physical data elements; and (b) analyzing information obtained during runtime of the at least one computer program; obtaining, based at least in part on user input, a second data lineage representing relationships among a plurality of business data elements; obtaining an association between at least some of the plurality of physical data elements of the first data lineage and at least some of the plurality of business data elements of the second data lineage; and generating, based on the association between the plurality of physical data elements and the plurality of business data elements, an indication of agreement or discrepancy between the first data lineage and the second data lineage.

Some embodiments are directed to at least one non-transitory computer-readable storage medium storing processor executable instructions that, when executed by at least one computer hardware processor, cause the at least one computer hardware processor to perform: obtaining a first data lineage representing relationships among a plurality of physical data elements, the first data lineage being generated at least in part by performing at least one of: (a) analyzing source code of at least one computer program configured to access at least some of the plurality of physical data elements; and (b) analyzing information obtained during runtime of the at least one computer program; obtaining, based at least in part on user input, a second data lineage representing relationships among a plurality of business data elements; obtaining an association between at least some of the plurality of physical data elements of the first data lineage and at least some of the plurality of business data elements of the second data lineage; and generating, based on the association between the plurality of physical data elements and the plurality of business data elements, an indication of agreement or discrepancy between the first data lineage and the second data lineage.

Some embodiments are directed to at least one non-transitory computer-readable storage medium storing processor executable instructions for execution by at least one computer hardware processor, the processor executable instructions comprising: means for obtaining a first data lineage representing relationships among a plurality of physical data elements, the first data lineage being generated at least in part by performing at least one of: (a) analyzing source code of at least one computer program configured to access at least some of the plurality of physical data elements; and (b) analyzing information obtained during runtime of the at least one computer program; means for obtaining, based at least in part on user input, a second data lineage representing relationships among a plurality of business data elements; means for obtaining an association between at least some of the plurality of physical data elements of the first data lineage and at least some of the plurality of business data elements of the second data lineage; and means for generating, based on the association between the plurality of physical data elements and the plurality of business data elements, an indication of agreement or discrepancy between the first data lineage and the second data lineage.

Some embodiments are directed to a data processing system for determining whether there is a discrepancy among a first data lineage, a second data lineage, and an association between data elements of the first and second data lineages. The system comprises at least one computer hardware processor; and at least one non-transitory computer-readable storage medium storing processor-executable instructions that, when executed by the at least one computer hardware processor, cause the at least one computer hardware processor to perform: obtaining a first data lineage representing relationships among a plurality of physical data elements, the first data lineage being generated at least in part by performing at least one of: (a) analyzing source code of at least one computer program configured to access at least some of the plurality of physical data elements; and (b) analyzing information obtained during runtime of the at least one computer program; obtaining, based at least in part on user input, a second data lineage representing relationships among a plurality of business data elements; obtaining an association between at least some of the plurality of physical data elements of the first data lineage and at least some of the plurality of business data elements of the second data lineage; and determining, based on the association between the plurality of physical data elements and the plurality of business data elements, whether there is one or more discrepancies among the first data lineage, the second data lineage, and the obtained association.

Some embodiments are directed to a method, comprising using at least one computer hardware processor to perform: obtaining a first data lineage representing relationships among a plurality of physical data elements, the first data lineage being generated at least in part by performing at least one of: (a) analyzing source code of at least one computer program configured to access at least some of the plurality of physical data elements; and (b) analyzing information obtained during runtime of the at least one computer program; obtaining, based at least in part on user input, a second data lineage representing relationships among a plurality of business data elements; obtaining an association between at least some of the plurality of physical data elements of the first data lineage and at least some of the plurality of business data elements of the second data lineage; and determining, based on the association between the plurality of physical data elements and the plurality of business data elements, whether there is one or more discrepancies among the first data lineage, the second data lineage, and the obtained association.

Some embodiments are directed to at least one non-transitory computer-readable storage medium storing processor executable instructions that, when executed by at least one computer hardware processor, cause the at least one computer hardware processor to perform: obtaining a first data lineage representing relationships among a plurality of physical data elements, the first data lineage being generated at least in part by performing at least one of: (a) analyzing source code of at least one computer program configured to access at least some of the plurality of physical data elements; and (b) analyzing information obtained during runtime of the at least one computer program; obtaining, based at least in part on user input, a second data lineage representing relationships among a plurality of business data elements; obtaining an association between at least some of the plurality of physical data elements of the first data lineage and at least some of the plurality of business data elements of the second data lineage; and determining, based on the association between the plurality of physical data elements and the plurality of business data elements, whether there is one or more discrepancies among the first data lineage, the second data lineage, and the obtained association.

Some embodiments are directed to at least one non-transitory computer-readable storage medium storing processor executable instructions for execution by at least one computer hardware processor, the processor executable instructions comprising: means for obtaining a first data lineage representing relationships among a plurality of physical data elements, the first data lineage being generated at least in part by performing at least one of: (a) analyzing source code of at least one computer program configured to access at least some of the plurality of physical data elements; and (b) analyzing information obtained during runtime of the at least one computer program; means for obtaining, based at least in part on user input, a second data lineage representing relationships among a plurality of business data elements; means for obtaining an association between at least some of the plurality of physical data elements of the first data lineage and at least some of the plurality of business data elements of the second data lineage; and means for determining, based on the association between the plurality of physical data elements and the plurality of business data elements, whether there is one or more discrepancies among the first data lineage, the second data lineage, and the obtained association.

Some embodiments are directed to a data processing system for determining a measure of data quality for one or more business data elements. The system comprises at least one computer hardware processor; and at least one non-transitory computer-readable storage medium storing processor executable instructions that, when executed by the at least one computer hardware processor, cause the at least one computer hardware processor to perform: obtaining a first data lineage representing relationships among a plurality of physical data elements, the first data lineage being generated at least in part by performing at least one of analyzing source code of at least one computer program configured to access at least some of the plurality of physical data elements and analyzing information obtained during runtime of the at least one computer program; obtaining, based at least in part on user input, a second data lineage representing relationships among a plurality of business data elements; obtaining an association between at least some of the plurality of physical data elements of the first data lineage and at least some of the plurality of business data elements of the second data lineage, the association including an association between a first physical data element of the plurality of physical data elements and a first business data element of the plurality of business data elements; and determining a measure of data quality for the first business data element based at least in part on at least one data quality measure associated with the first physical data element and the association between the first physical data element and the first business data element.

In some embodiments, determining the measure of data quality for the first business data element comprises performing an analysis of data quality of data in the first physical data element based at least in part on one or more data quality rules associated with the data in the first physical data element to obtain the at least one data quality measure associated with the first physical data element.

In some embodiments, the data processing system of claim 18, wherein the measure of data quality for the first business element includes a measure of one or more of accuracy, completeness, and validity.

Some embodiments are directed to a method comprising using at least one computer hardware processor to perform: obtaining a first data lineage representing relationships among a plurality of physical data elements, the first data lineage being generated at least in part by performing at least one of analyzing source code of at least one computer program configured to access at least some of the plurality of physical data elements and analyzing information obtained during runtime of the at least one computer program; obtaining, based at least in part on user input, a second data lineage representing relationships among a plurality of business data elements; obtaining an association between at least some of the plurality of physical data elements of the first data lineage and at least some of the plurality of business data elements of the second data lineage, the association including an association between a first physical data element of the plurality of physical data elements and a first business data element of the plurality of business data elements; and determining a measure of data quality for the first business data element based at least in part on at least one data quality measure associated with the first physical data element and the association between the first physical data element and the first business data element.

Some embodiments are directed to at least one non-transitory computer-readable storage medium storing processor executable instructions that, when executed by at least one computer hardware processor, cause the at least one computer hardware processor to perform: obtaining a first data lineage representing relationships among a plurality of physical data elements, the first data lineage being generated at least in part by performing at least one of analyzing source code of at least one computer program configured to access at least some of the plurality of physical data elements and analyzing information obtained during runtime of the at least one computer program; obtaining, based at least in part on user input, a second data lineage representing relationships among a plurality of business data elements; obtaining an association between at least some of the plurality of physical data elements of the first data lineage and at least some of the plurality of business data elements of the second data lineage, the association including an association between a first physical data element of the plurality of physical data elements and a first business data element of the plurality of business data elements; and determining a measure of data quality for the first business data element based at least in part on at least one data quality measure associated with the first physical data element and the association between the first physical data element and the first business data element.

Some embodiments are directed to at least one non-transitory computer-readable storage medium storing processor executable instructions for execution by at least one computer hardware processor, the processor executable instructions comprising: means for obtaining a first data lineage representing relationships among a plurality of physical data elements, the first data lineage being generated at least in part by performing at least one of analyzing source code of at least one computer program configured to access at least some of the plurality of physical data elements and analyzing information obtained during runtime of the at least one computer program; means for obtaining, based at least in part on user input, a second data lineage representing relationships among a plurality of business data elements; means for obtaining an association between at least some of the plurality of physical data elements of the first data lineage and at least some of the plurality of business data elements of the second data lineage, the association including an association between a first physical data element of the plurality of physical data elements and a first business data element of the plurality of business data elements; and means for determining a measure of data quality for the first business data element based at least in part on at least one data quality measure associated with the first physical data element and the association between the first physical data element and the first business data element.

The foregoing is a non-limiting summary of the invention, which is defined by the attached claims.

BRIEF DESCRIPTION OF DRAWINGS

Various aspects and embodiments will be described with reference to the following figures. It should be appreciated that the figures are not necessarily drawn to scale. Items appearing in multiple figures are indicated by the same or a similar reference number in all the figures in which they appear.

FIG. 4A is a diagram illustrating a graphical interface through which a business data element may be associated with a physical data element, in accordance with some embodiments of the technology described herein.

FIGS. 6A-B are diagrams of illustrative graphical interfaces showing information about a business data element "credit score," in accordance with some embodiments of the technology described herein.

FIG. 6E is a diagram of an illustrative user interface indicating presence of a discrepancy between the user-specified and derived lineages for the business data element "credit score," in accordance with some embodiments of the technology described herein.

DETAILED DESCRIPTION

Figure 1:
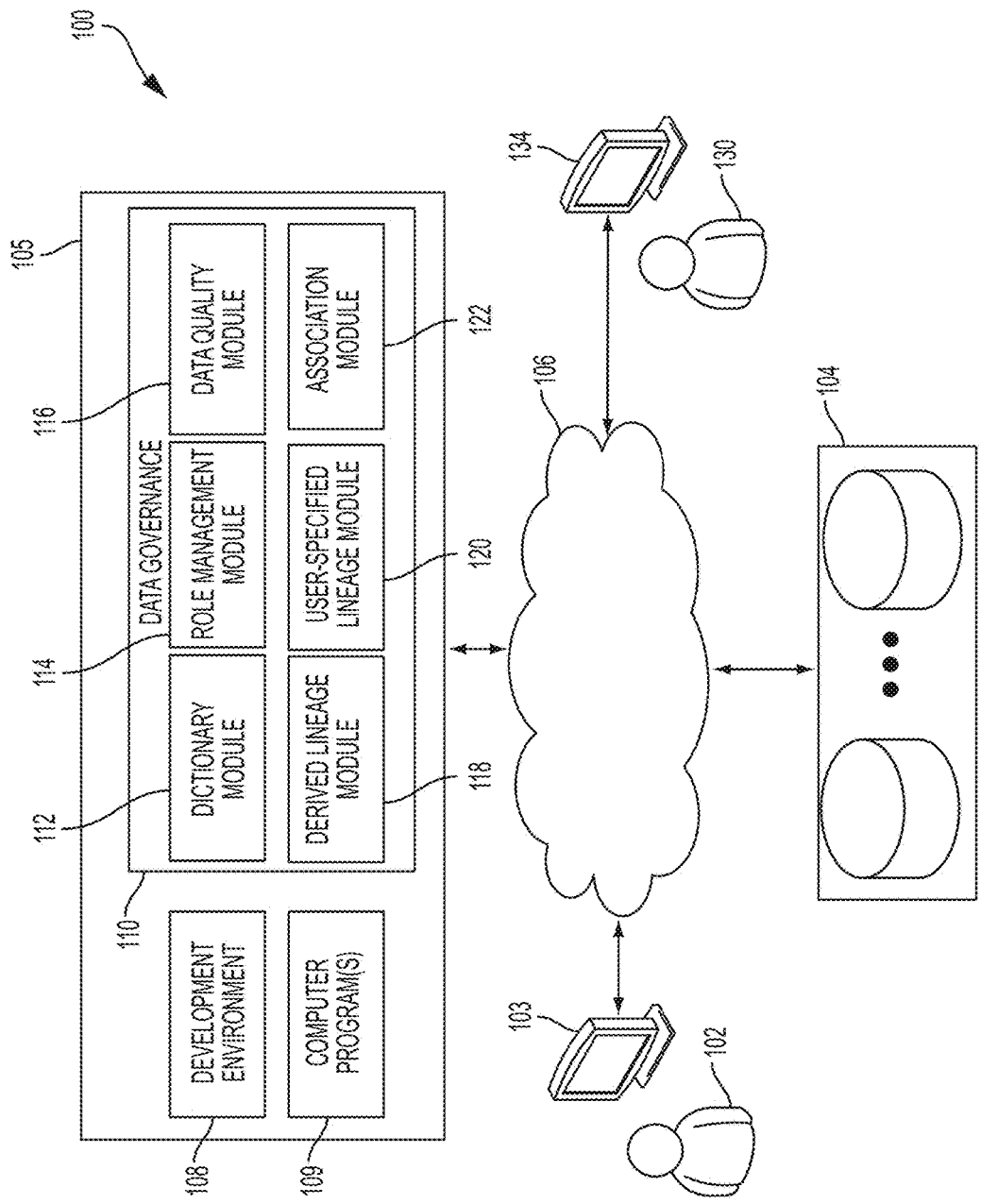
FIG. 1 is a block diagram of an illustrative computing environment, in which some embodiments of the technology described herein may operate.

The inventors have recognized and appreciated that accuracy, auditability efficiency, and reliability of a data processing system may be improved by techniques that facilitate generating accurate and complete lineage information for data managed by the data processing system. Such techniques may be used to identify the presence of problems in data processing systems and facilitate their resolution, thereby improving functionality of data processing systems and reducing data processing errors. The inventors have further recognized and appreciated techniques for improving conventional approaches to generating data lineage information.

Some conventional techniques for generating data lineage information are manual. Although using manual techniques for generating data lineage information allows for customizing the generated data lineage information to include terminology understood by and information of interest to the people requesting the data lineage information, there are numerous disadvantages. First, the accuracy of data lineage information generated using conventional manual techniques cannot be automatically verified. For example, when a person manually creating a data lineage for a report indicates that some data used for generating the report originated from a particular data source (e.g., a database system at a particular location), that indication cannot be verified in any way other than by manually re-checking the person's work. Second, manually generated data lineage information quickly becomes stale as data managed by a data processing system frequently changes, for example, because of the removal and/or addition of data sources, migration of data, changes to data processing logic, and the like. Such changes occur at a fast rate with which conventional manual lineage generation techniques cannot keep up.

Automated techniques for generating data lineage information may address some of these shortcomings. For example, automated date lineage generation techniques may be executed repeatedly such that the data lineage information generated is up-to-date. As another example, the generated data lineage information may be verified by one or more computer programs. However, automated techniques for generating data lineage information also have some disadvantages. For example, data lineage information produced by an automated technique (e.g., a technique based on analyzing the source code of one or more applications operating on data managed by a data processing system) may include terminology (e.g., technical names of variables and data record fields) that is not easily understood by the people (e.g., business people) viewing the data lineage information. As another example, the automatically generated data lineage information may include much more information than the people viewing it wish to see. For instance, automatically generated data lineage information may include detailed information about each and every transformation applied to the data including some that are likely inconsequential to the people viewing the lineage (e.g., sorting data records according to a key to extract information about all customers whose last names begin with "A" may be a transformation that is not of interest to a bank executive interested in the lineage of a data value indicating the credit score of a bank customer whose last name is "Armstrong").

The inventors have recognized and appreciated that both manually and automatically obtained information provides useful information that can be used to refine the overall data lineage. Accordingly, some embodiments provide for improved techniques for generating data lineage information. Rather than using only manually-generated data lineage information or only automatically-generated data lineage information, each of which has drawbacks including those described above, the techniques developed by the inventors and described herein provide for generating accurate and complete data lineage information by: (1) obtaining manually generated data lineage information (termed "user-specified data lineage" or "user-specified lineage" or "stated lineage" herein); (2) obtaining automatically generated data lineage information (termed "derived data lineage" or "derived lineage" herein); and (3) obtaining an association between the user-specified and derived data lineages (e.g., by generating an association or accessing a previously generated association). The obtained association may be used to address at least some of the above-described drawbacks of using either type of data lineage information alone. As one example, the association between a user-specified data lineage and a derived data lineage may be used to verify the accuracy of the user-specified data lineage and, more generally, to identify discrepancies or inconsistencies between these two types of lineages. As another example, the association between a user-specified lineage and a derived data lineage may map information in the derived data lineage, often expressed using technical terminology, to business terminology more readily accessible by consumers of data lineage information. As yet another example, the association between a user-specified data lineage and a derived data lineage may be used to verify the accuracy of the derived data lineage. Identifying errors in the derived data lineage (e.g., via an inconsistency with the user-specified lineage) allows for the identification of problems with underlying data processing systems, the communication links among them, and/or data processing errors. In turn, identifying and addressing such problems improves the functionality of the underlying data processing systems and reduces data processing errors. Because a derived data lineage provides extremely detailed information about the flow of data, finding errors from such detailed information is very difficult—it is akin to finding a needle in a haystack. Associating a user-specified lineage to the derived data lineage, in accordance with the embodiments described herein, facilitates identifying any data processing errors in a way that the derived data lineage alone does not.

The techniques developed by the inventors and described herein improve data processing systems. First, the techniques described herein provide an improvement over conventional data lineage techniques, which are included in many data processing systems. Second, the techniques described herein allow for generating indications of agreement and/or discrepancy between user-specified and derived data lineages, which allows for the identification of errors in either type of lineage and, as a result, facilitates identifying and resolving data processing errors in data processing systems.

Some embodiments described herein address all of the above-described issues that the inventors have recognized with conventional techniques for generating data lineage information. However, not every embodiment described below addresses every one of these issues, and some embodiments may not address any of them. As such, it should be appreciated that embodiments of the technology described herein are not limited to addressing all or any of the above-discussed issues of conventional techniques for generating data lineage information.

In some embodiments, a data processing system may be configured to: (1) obtain a derived data lineage representing relationships among physical data elements; (2) obtain a user-specified data lineage representing relationships among business data elements; (3) obtain an association between the derived data lineage and the user-specified data lineage (e.g., by generating an association between at least some of the physical data elements of the derived data lineage and at least some of the business data elements of the user-specified data lineage); and (4) generating, based on the association between the plurality of physical data elements and the plurality of business data elements, an indication of agreement or discrepancy between the first data lineage and the second data lineage.

Figure 8A:
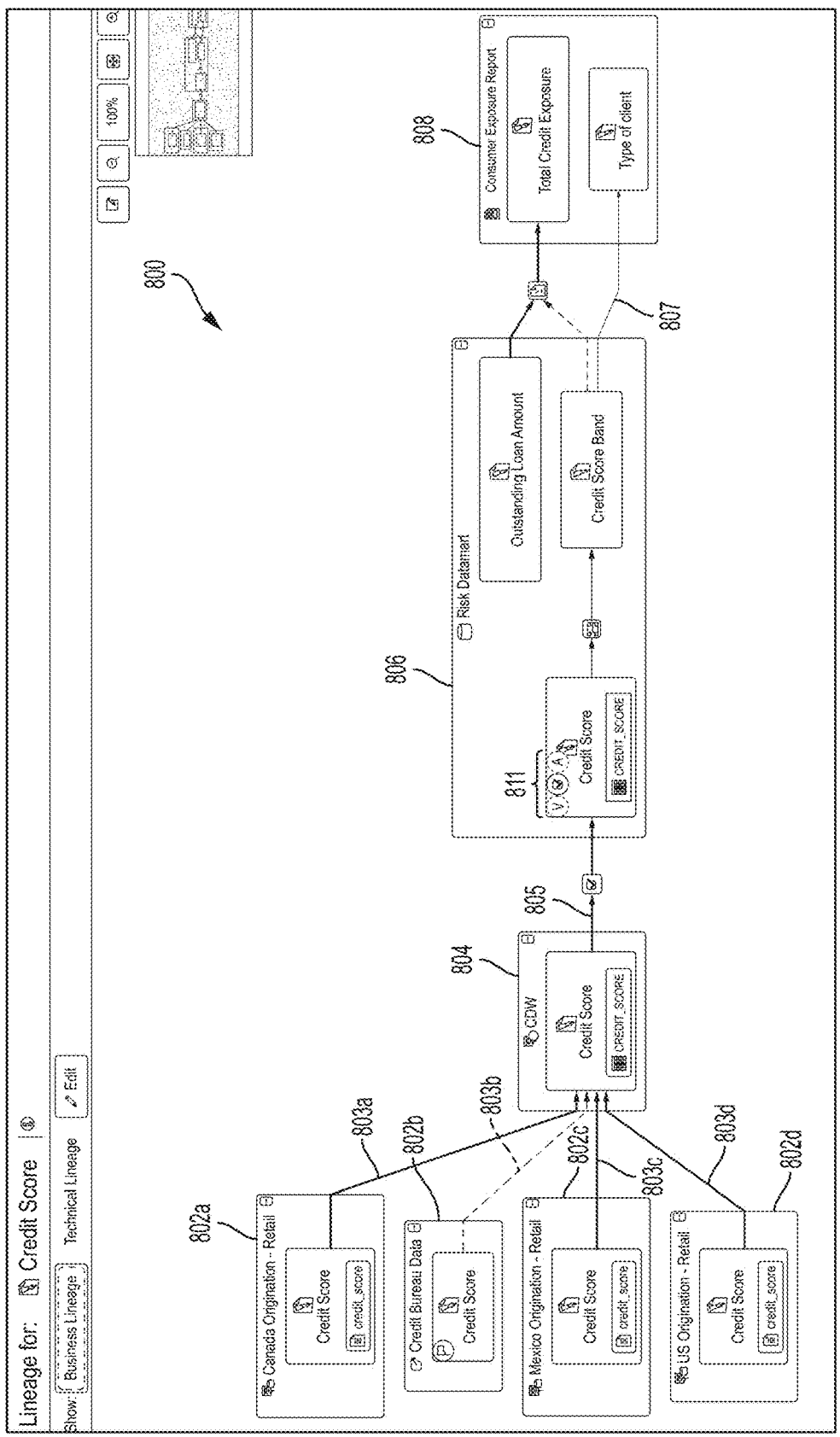
FIG. 8A is a diagram of an illustrative user interface presenting a user-specified data lineage, in accordance with some embodiments of the technology described herein.
Figure 8B:
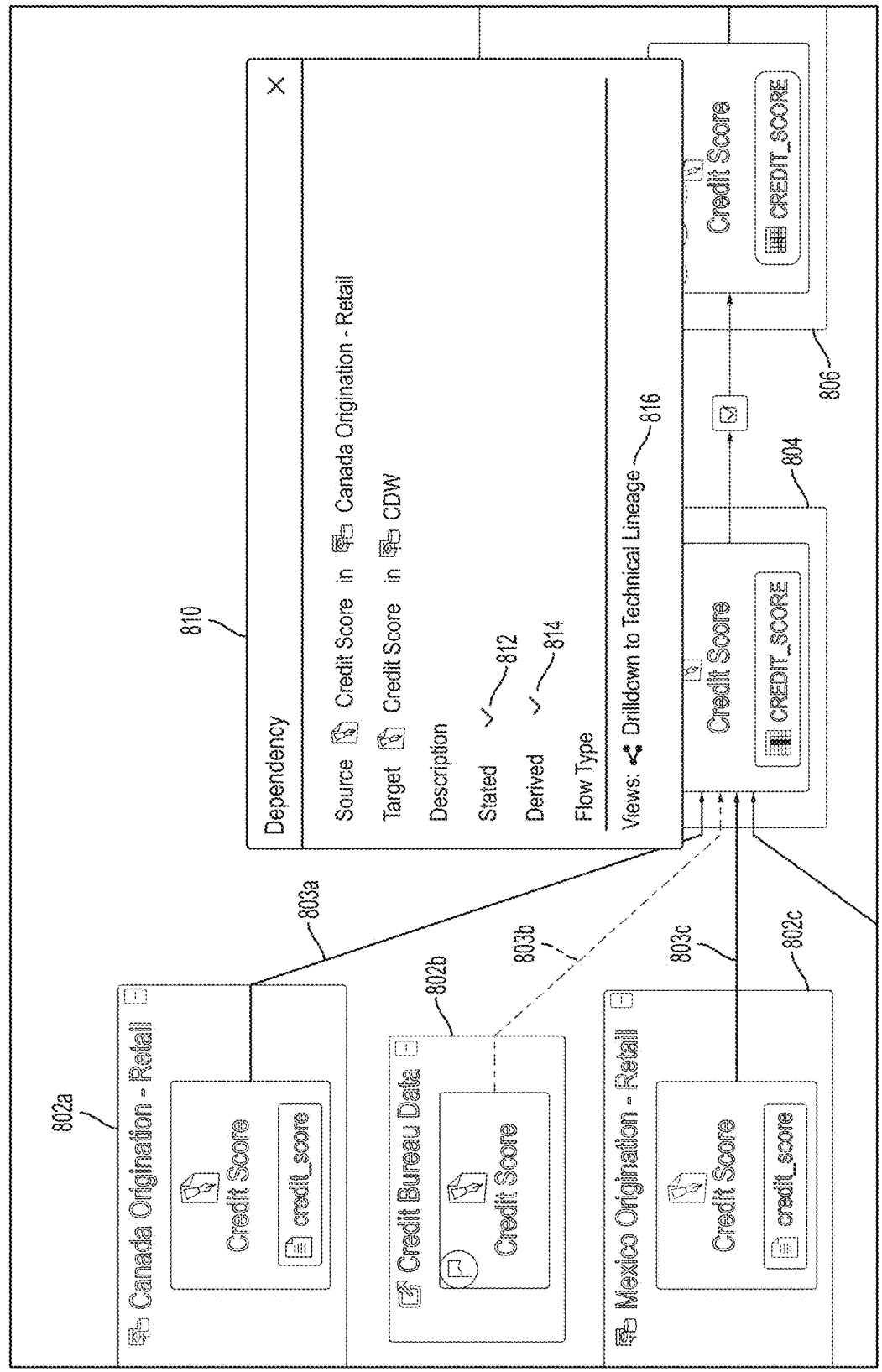
FIG. 8B is a diagram of an illustrative user interface providing details about dependency between two business data elements in the user-specified data lineage of FIG. 8A, in accordance with some embodiments of the technology described herein.
Figure 8C:
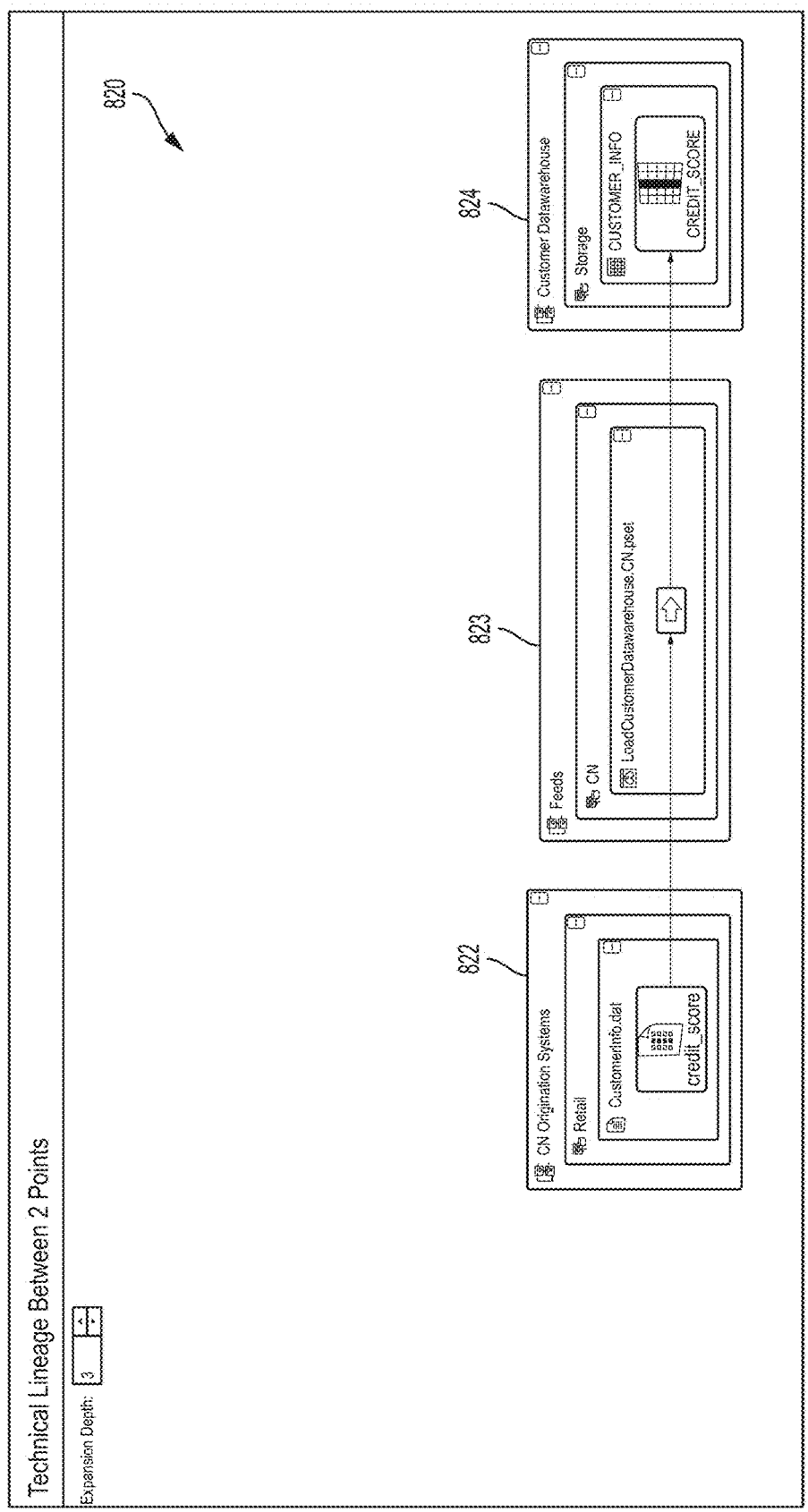
FIG. 8C is a diagram of an illustrative user interface presenting a derived data lineage corresponding to a portion of the user-specified data lineage of FIG. 8A, in accordance with some embodiments of the technology described herein.

In some embodiments, generating the indication of agreement or discrepancy comprises: displaying a visualization of the second data lineage showing the indication of agreement or discrepancy. Non-limiting examples of such visualizations are provided herein in FIGS. 6A-6E and 8A-8F. For example, the user-specified data lineage may include a first link representing a first dependency between two business data elements, and displaying the visualization of the user-specified data lineage may comprise displaying the link in one manner (e.g., using a thick line as shown in FIG. 8A) when there is a dependency in the derived data lineage corresponding to the first dependency and in another manner (e.g., using a thin line as shown in FIG. 8A) when there is not a dependency in the derived data lineage corresponding to the first dependency.

In some embodiments, generating the indication of agreement or discrepancy determining, based on the association between the derived data lineage and the user-specified data lineage, whether there is any discrepancy among the derived data lineage, the user-specified data lineage, and the association between the derived and user-specified data lineages.

In some embodiments, a physical data element may be any data element stored and/or processed by a data processing system. For example, a physical data element may be a field in a data record, and the value of the physical data element may be the value stored in the field of the data record. As another example, a physical data element may be a cell in a table (e.g., a cell occurring at a particular row and column of the table) and the value of the physical data element may be the value in the cell of the table. As yet another example, a physical data element may be a variable (e.g., in a report) and the value of the physical element may be value of the variable (e.g., in a particular instance of the report).

In some embodiments, a business data element may be any data element representing a conceptual quantity having relevance to a business. A business data element may be referred to (e.g., named and/or identified) by using natural language familiar to a business user (e.g., a business term). There may be one or multiple physical data elements that correspond to the business data element in that they store one or multiple values that are instances of the conceptual quantity, which the business data element represents. One example of a business data element may be a bank customer's credit score, which is a conceptual quantity relevant to a bank's business. There may be one or more physical data elements (e.g., in one or more tables, files, spreadsheets, data streams, etc.) storing values representing the bank customer's credit score. In this example, there may be multiple physical data elements corresponding to the business data element because the customer's credit score may be stored in multiple locations or because there are multiple different credit scores for the customer (e.g., different credit scores provided by different credit rating agencies). Thus, there may be one or multiple physical data elements corresponding to a single business data element. On the other hand, in some embodiments, there may be only a single business data element corresponding to a particular physical data element. A business data element may take on a value of a corresponding physical data element.

It should be appreciated that although there may be one or more physical elements corresponding to a business data element, a conventional data processing system may not have access to information indicating such a correspondence. Without access to such information, a data processing system may not be able to automatically identify which physical data element(s) correspond to a business data element and/or which business data element corresponds to one or more physical data element(s). By contrast, some embodiments of the technology described herein provide for generating and storing an association between physical and business data elements. The generated association between a physical data element and a business data element may constitute information indicating the correspondence between the physical and business data elements. In some embodiments, a data processing system may use such associations to determine, automatically, which physical data elements and business data elements correspond to one another.

In some embodiments, a derived data lineage may include information about the lineage of one or physical data elements stored and/or processed by a data processing system. Information about the lineage of a physical data element may include upstream lineage information indicating how the value of the physical data element was obtained. For example, the upstream lineage information may identify data (e.g., one or more other physical data elements) from which the physical data element was obtained and/or one or more transformations that have been applied to the data. Information about the lineage of the physical data element may, additionally or alternatively, include downstream lineage information indicating one or more other datasets, physical data elements, processes, and/or applications that depend on the value of the physical data element.

In some embodiments, a derived data lineage may be obtained by analyzing the source code of at least one computer program configured to access (e.g., read, write, and modify) at least some of the plurality of physical data elements managed by a data processing system. The source code analysis may be performed by using any suitable static code analysis techniques and/or any other suitable technique(s). The source code analysis may be used to identify one or more physical data elements input and/or accessed by the computer program, identify one or more transformations applied to the inputs and/or computations performed using the inputs as part of the computer program, and/or identify one or more outputs of the computer program. In some embodiments, the computer program may comprise a dataflow graph.

In some embodiments, in addition to or instead of analyzing the source code of one or more computer programs, a derived data lineage may be obtained by analyzing information obtained during runtime of the at least one computer program. For example, in some embodiments, one or more logs generated during runtime of a computer program may be analyzed to identify inputs to the computer program, one or more transformations applied to the inputs and/or computations performed using the inputs as part of the computer program, and/or one or more outputs of the computer program.

In some embodiments, a user-specified data lineage may be specified by a user and may represent relationships among business data elements. The user-specified lineage may include upstream and downstream lineage information. For example, the user-specified lineage may include information indicating one or more other business data elements used to generate (e.g., calculate) a business data element of interest to the business (e.g., a credit score of a bank customer). In some embodiments, one or more graphical user interfaces may be provided to the user to facilitate his/her specifying a user-specified data lineage.

In some embodiments, obtaining an association between a derived data lineage and a user-specified data lineage may be performed by generating an association between one or more physical data elements in the derived data lineage and one or more corresponding business data elements in the user-specified data lineage. In some embodiments, an association between a physical data element and a business data element may be generated automatically, for example, based on metadata (e.g., names) of the physical and business data elements. In some embodiments, an association between a physical data element and a business data element may be generated based on user input specifying the association. In such embodiments, one or more graphical user interfaces may be provided to the user to facilitate his/her specifying the association.

In some embodiments, the association between a derived data lineage and a user-specified data lineage may be used to determine whether there is a discrepancy between these types of lineages. For example, when the association between the lineages that business data element "B" is associated with physical data element "P", determining whether there is a discrepancy may include determining that a first set of one or more sources of data identified in the derived data lineage as being used to obtain a physical data element P is different from a second set of one or more sources of data identified in the user-specified lineage as being used to obtain the business data element B.

In some embodiments, the derived data lineage may be updated and the determination of whether there is a discrepancy between the derived data lineage and the user-specified data lineage may be repeated. In this way, discrepancies between the lineages that could arise because of changes to the data managed by the data processing system may be detected.

It should be appreciated that an association between a derived data lineage and a user-specified data lineage is not limited to being used for identifying discrepancies between the lineages and may be used for any other suitable purpose. For example, in some embodiments, the association between the lineages may be used to obtain a measure of data quality for one or more business data elements.

In some embodiments, quality of data in one or more physical data elements may be evaluated. For example, quality of the data may be evaluated using predefined data quality rules, which may define criteria for evaluating the values of physical data elements, such as by identifying characteristics (e.g., accuracy, precision, completeness, and validity) of the values according to the criteria. The extent to which the values exhibit these characteristics may thereby produce a measure of data quality for the physical data elements and, by virtue of the association between the physical and business data elements, a measure of data quality for the business data elements.

Accordingly, in some embodiments, a data processing system may be configured to: (1) obtain a derived data lineage representing relationships among physical data elements; (2) obtain a user-specified data lineage representing relationships among business data elements; (3) obtain an association between the derived data lineage and a user-specified data lineage, the association including an association between a first physical data element in the derived data lineage and a first business data element in the user-specified data lineage; and (4) determine, based on the association between the derived data lineage and the user-specified data lineage and a measure of data quality for a first physical data element, a measure of data quality for the first business data element.

It should be appreciated that the embodiments described herein may be implemented in any of numerous ways. Examples of specific implementations are provided below for illustrative purposes only. It should be appreciated that these embodiments and the features/capabilities provided may be used individually, all together, or in any combination of two or more, as aspects of the technology described herein are not limited in this respect.

FIG. 1 is a block diagram of an illustrative computing environment 100, in which some embodiments of the technology described herein may operate. Computing environment 100 includes data processing system 105, which is configured to operate on data stored in data store 104.

In some embodiments, data store 104 may include one or multiple storage devices storing data in one or more formats of any suitable type. For example, the storage device(s) part of data store 104 may store data using one or more database tables, spreadsheet files, flat text files, and/or files in any other suitable format (e.g., a native format of a mainframe). The storage device(s) may be of any suitable type and may include one or more servers, one or more database systems, one or more portable storage devices, one or more non-volatile storage devices, one or more volatile storage devices, and/or any other device(s) configured to store data electronically. In some embodiments, data store 104 may include one or more online data streams in addition to or instead of storage device(s). Accordingly, in some embodiments, data processing system 105 may have access to data provided over one more data streams in any suitable format.

In embodiments where data store 104 includes multiple storage devices, the storage devices may be co-located in one physical location (e.g., in one building) or distributed across multiple physical locations (e.g., in multiple buildings, in different cities, states, or countries). The storage devices may be configured to communicate with one another using one or more networks such as, for example, network 106 shown in FIG. 1.

In some embodiments, the data stored by the storage device(s) may include one or multiple data entities such as one or more files, tables, data in rows and/or columns of tables, spreadsheets, datasets, data records (e.g., credit card transaction records, phone call records, and bank transaction records), fields, variables, messages, and/or reports. The storage device(s) may store thousands, millions, tens of millions, or hundreds of millions of data entities. Each data entity may include one or multiple physical data elements.

A physical data element may be any data element stored and/or processed by a data processing system. For example, a physical data element may be a field in a data record, and the value of the physical data element may be the value stored in the field of the data record. As a specific non-limiting example, a physical data element may be a field storing a caller's name in a data record storing information about a phone call (which data record may be part of multiple data records about phone calls made by customers of a telecommunication's company) and the value of the physical data element may be the value stored in the field. As another example, a physical data element may be a cell in a table (e.g., a cell occurring at a particular row and column of the table) and the value of the physical data element may be the value in the cell of the table. As another example, a physical data element may be a variable (e.g., in a report) and the value of the physical element may be value of the variable (e.g., in a particular instance of the report). As a specific non-limiting example, a physical data element may be a variable in a report about a bank loan applicant representing the applicant's credit score, and the value of the physical data element may be the numeric value of the credit score (e.g., a numeric value between 300 and 850). The value of the physical data element representing the applicant's credit score may change depending on the data used to generate the report about the bank loan applicant.

In some embodiments, a physical data element may take on a value of any suitable type. For example, a physical data element may take on a numeric value, an alphabetic value, a value from a discrete set of options (e.g., a finite set of categories), or any other suitable type of value, as aspects of the technology described herein are not limited in this respect.

Data processing system 105 may include one or multiple computer programs 109 configured to operate on data in data store 104. The computer programs 109 may be of any suitable type and written in any suitable programming language(s). For example, in some embodiments, computer programs 109 may include one or more computer programs written at least in part using the structured query language (SQL) and configured to access data in one or more databases part of data store 104. As another example, in some embodiments, data processing system 105 is configured to execute programs in the form of graphs and computer programs 109 may comprise one or more computer programs developed as dataflow graphs. A dataflow graph may include components, termed "nodes" or "vertices," representing data processing operations to be performed on input data and links between the components representing flows of data. Techniques for executing computations encoded by dataflow graphs is described in U.S. Pat. No. 5,966,072, titled "Executing Computations Expressed as Graphs," which is incorporated by reference herein in its entirety.

In the illustrated embodiment of FIG. 1, data processing system 105 further includes development environment 108 that may be used by a person (e.g., a developer) to develop one or more of computer programs 109 for operating on data in data store 104. For example, in some embodiments, user 102 may use computing device 103 to interact with development environment to specify a computer program, such as a dataflow graph, and save the computer program as part of computer programs 109. An environment for developing computer programs as data flow graphs is described in U.S. Pat. Pub. No.: 2007/0011668, titled "Managing Parameters for Graph-Based Applications," which is incorporated by reference herein in its entirety.

In some embodiments, one or more of computer programs 109 may be configured to perform any suitable operations on data in data store 104. For example, one or more of computer programs 109 may be configured to access data from one or more sources, transform the accessed data (e.g., by changing data values, filtering data records, changing data formats, sorting the data, combining data from multiple sources, splitting data into multiple portions, and/or in any other suitable way), calculate one or more new values from accessed data, and/or write the data to one or multiple destinations.

In some embodiments, one or more of computer programs 109 may be configured to perform computations on and/or generate reports from data in data store 109. The computations performed and/or reports generated may be related to one or more quantities relevant to a business. For example, a computer program may be configured to access credit history data for a person and determine a credit score for the person based on the credit history. As another example, a computer program may access telephone call logs of multiple customers of a telephone company and generate a report indicating how many of the customers use more data than allowed for in their data plans. As yet another example, a computer program may access data indicating the types of loans made by a bank and generate a report indicating the overall risk of loans made by the bank. These examples are illustrative and non-limiting, as a computer program may be configured to generate any suitable information (e.g., for any suitable business purpose) from data stored in data store 104.

In the illustrated embodiment, data processing system 105 also includes a data governance module 110 that supports the performance of various data governance tasks. For example, in the illustrated embodiment, data governance module 110 includes data dictionary module 112, role management module 114, data quality module 116, derived lineage module 118, user-specified lineage module 120, and lineage association module 122, each of which comprises processor-executable instructions that, when executed, perform functionality supporting the performance of one or more data governance tasks, as described in greater detail below.

In some embodiments, data dictionary module 112 may be configured to store information about data in data store 104. That is, data dictionary 112 may be configured to store metadata associated with data in data store 104. For example, data dictionary 112 may store one or more alternative names for physical data elements in data store 104. In this way, rather than referring to a physical data element by the name of the variable to which it corresponds (which variable name may have been created by a programmer and is not "user-friendly" in that it does not immediately convey to a user what information the variable represents), the data dictionary may include one or more alternative terms for the physical data element such as, for example, a natural language term or phrase that business people would use to refer to the physical data element. As a specific example, the data dictionary 112 may store the name "Bank Customer Credit Score" or "Bank Customer FICO Credit Score" as an alternative name for a physical data element corresponding to a variable named "cstCrdScr," which stores the value of a FICO credit score for a particular bank customer. As another specific example, the data dictionary 112 may store the name "Order Amount" as language that may be used for referring to the physical data element corresponding to a field named "order_amt."

In some embodiments, role management module 114 may manage information indicating which party or parties are responsible for various data elements stored in data store 104. Managing such role information may include storing the role information, allowing one or more users to modify such information (e.g., by removing, adding, or changing parties and/or their responsibilities), and/or displaying the role information.

Figure 6A:
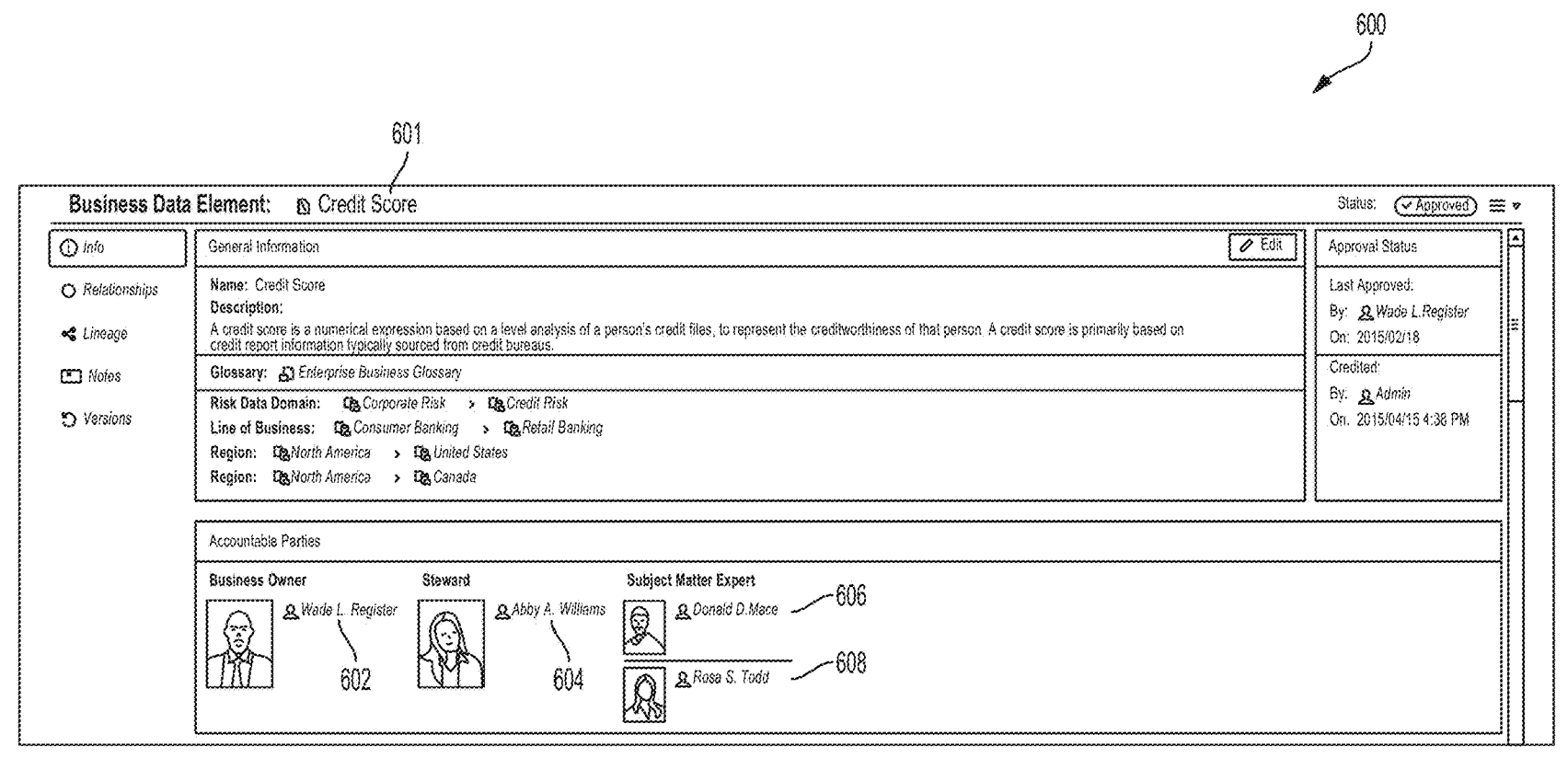

In some embodiments, the role management module 114 may specify responsible parties for one or more physical data elements and/or one or more business data elements. For example, role management module 114 may be configured to manage information used for generating (and, in some embodiments, may be configured to generate) a graphical interface indicating parties accountable for management of a data element. An illustrative example of such a graphical interface is shown in FIG. 6A, which identifies four individuals (including a business owner 602, data steward 604, and two subject matter experts 606 and 608) accountable for management of the "credit score" business data element 601.

In some embodiments, data quality module 116 may be configured to determine one or more measures of data quality for each of one or more physical data element. The quality of data in physical data elements may be determined in any suitable way. For example, in some embodiments, the quality of the data may be evaluated using predefined data quality rules, which may define criteria for evaluating the values of physical data elements, such as by identifying characteristics (e.g., accuracy, precision, completeness, and validity) of the values according to the criteria. The extent to which the values exhibit these characteristics may thereby produce a measure of data quality for the physical data elements. Aspects of evaluating the quality of data using data quality rules are described in U.S. Pat. Pub. No.: 2014/0108357, "Specifying and Applying Rules to Data," which is incorporated by reference herein in its entirety.

In some embodiments, derived lineage module 118 may be configured to generate a derived data lineage for at least some of the data in data store 104. A derived data lineage may include information about the lineage of one or physical data elements. For example, a derived data linage may include upstream lineage information indicating how the value of the physical data element was obtained and/or downstream lineage information indicating one or more other datasets, physical data elements, processes, and/or applications that depend on the value of the physical data element.

In some embodiments, derived lineage module 118 may be configured to generate a derived data lineage by analyzing the source code of at least one computer program configured to access (e.g., read, write, and modify) at least some of the plurality of physical data elements managed by a data processing system. The source code analysis may be used to identify inputs to a computer program (e.g., identify one or more physical data elements accessed by the computer program), identify one or more transformations applied to the inputs and/or computations performed using the inputs as part of the computer program, and/or identify one or more outputs of the computer program. In some embodiments, the computer program may comprise a dataflow graph.

In some embodiments, derived lineage module 118 may be configured to generate a derived data lineage by analyzing information obtained during runtime of the at least one computer program. For example, in some embodiments, one or more logs generated during runtime of a computer program may be analyzed to identify inputs to the computer program, one or more transformations applied to the inputs and/or computations performed using the inputs as part of the computer program, and/or one or more outputs of the computer program.

In some embodiments, derived lineage module 118 may be configured to generate a derived data lineage by using one or more data discovery processes. For example, in some embodiments, a computer program implementing a data discovery may be configured to identify different physical data elements containing the same data values and, based on that identification, determine that these physical data elements are related. For example, the computer program may be configured to determine that a same table of data is stored in multiple different databases and, on that basis, determine that the physical data elements in these tables are related. It should be appreciated that the derived lineage module 118 may be configured to generate a derived lineage using any of the above-described ways or any combination of two or more of the above-described or other ways, as aspects of the technology described herein are not limited in this respect.

Figure 2:
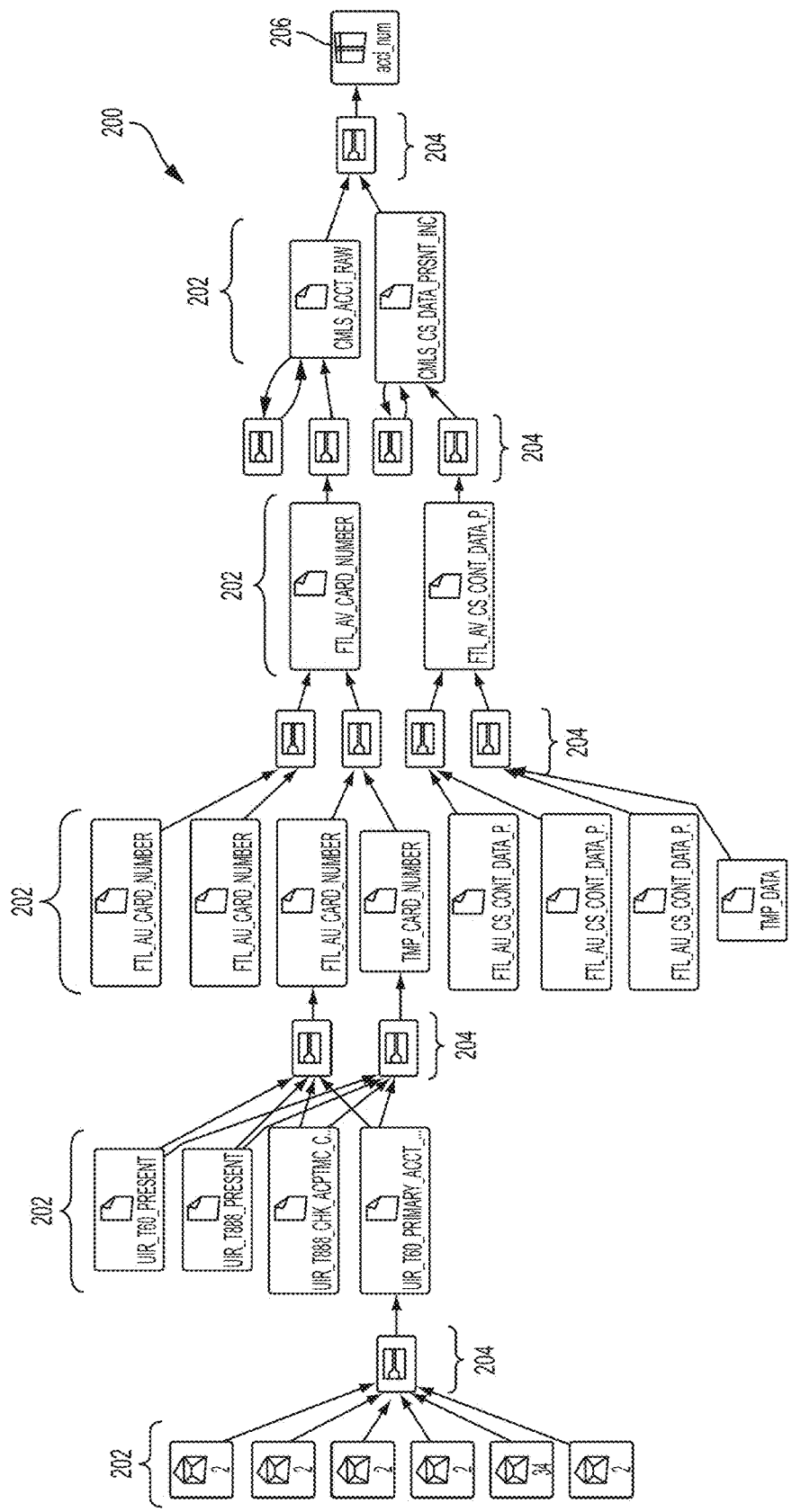
FIG. 2 is an illustrative graphical representation of an illustrative derived data lineage, in accordance with some embodiments of the technology described herein.

FIG. 2 is a data lineage diagram 200 of an illustrative derived data lineage. The derived data lineage and the diagram illustrating it may be generated by derived lineage module 118. Data lineage diagram 200 includes nodes 202 representing data entities and nodes 204 representing transformations applied to the data entities. The data lineage diagram 200 shows illustrates upstream lineage information for one or more physical data elements in data entity 206. Arrows coming into a node representing a transformation indicate which data entities are provided as inputs to the transformation. Arrows coming out of nodes representing transformations of data indicate data entities into which results of the transformations are provided. Examples of data entities are provided herein. Examples of transformations include, but are not limited to, performing calculations of any suitable type, sorting the data, filtering the data to remove one or more portions of data (e.g., filtering data records to remove one or more data records) based on any suitable criteria, merging data (e.g., using a join operation or in any other suitable way), performing any suitable database operation or command, and/or any suitable combination of the foregoing transformations. A transformation may be implemented using one or more computer programs of any suitable type including, by way of example and not limitation, one or more computer programs implemented as dataflow graphs.

A data lineage diagram, such as diagram 200 shown in FIG. 2, may be useful for a number of reasons. For example, illustrating relationships between data entities and transformations may help a user to determine how a particular physical data element was obtained (e.g., how a particular value in a report was compute). As another example, a data lineage diagram may be used to determine which transformations were applied to various physical data elements and/or data entities.

In some embodiments, a derived data lineage may represent relationships among physical data elements, data entities containing those physical data elements, and/or transformations applied to the physical data elements. The relationships among physical data elements, data entities, and transformations, may be used to determine relationships among other things such as, for example, systems (e.g., one or more computing devices, databases, data warehouses, etc.) and/or applications (e.g., one or more computer programs that access data managed by a data processing system). For example, when a physical data element part of a table in a database stored in system "A" located in one physical location is indicated, within a derived data lineage, to be derived from another physical data element part of another table in another database stored in system "B," then a relationship between systems A and B may be inferred. As another example, when an application program reads one or more physical data elements from a system, a relationship between the application program and the system may be inferred. As yet another example, when one application program accesses physical data elements operated on by another application program, a relationship between the application programs may be inferred. Any one or more of these relationships may be shown as part of a data lineage diagram.

It should be appreciated that a data processing system may manage a large number of physical data elements (e.g., millions, billions or trillions of physical data elements).[1] Accordingly, derived data lineage may represent relationships among a large number of physical data elements, data entities containing those physical data elements, and/or transformations applied to the physical data elements. Because a derived data lineage may include a large amount of information, it is important to present that information in a manner that is digestible by the viewer. Accordingly, in some embodiments, information in a derived data lineage may be visualized at different levels of granularity. Various techniques for visualizing information in derived lineages and some aspects of techniques for generating and/or visualizing derived data lineages are described in: (1) U.S. Pat. App. Pub. No. 2010/0138431, titled "Visualizing Relationships Between Data Elements and Graphical Representations of Data Element Attributes"; (2) U.S. Pat. App. Pub. No. 2016/0232230, titled "Filtering Data Lineage Diagrams"; (3) U.S. Pat. App. Pub. No. 2016/0028580, titled "Data Lineage Summarization"; and (4) U.S. Pat. App. Pub. No. 2016/0019286, titled "Managing Lineage Information," each of which is incorporated by reference in its entirety.

1 For example, a data processing system managing data associated with credit card transactions may process billions of credit card transactions a year and each of the transactions may include multiple physical data elements such as, for example, credit card number, date, merchant id, and purchase amount.

In some embodiments, user-specified lineage module 120 may be configured to facilitate the specification of a user-specified lineage by a user (e.g., user 102 or any other suitable user). The user-specified lineage module 120 may be configured to provide one or more graphical user interfaces to the user to facilitate his/her manually specifying a lineage. The graphical user interface(s) may provide a canvas wherein a user can drag and drop graphical display elements corresponding to business data elements. The graphical display elements may be connected used links (e.g., lines, directional arrows, etc.) to indicate lineage relationships among the business data elements represented by the graphical display elements.

In some embodiments, a user-specified data lineage may be specified by a user and may represent relationships among business data elements. The user-specified lineage may include upstream and downstream lineage information. For example, the user-specified lineage may include information indicating one or more other business data elements used to generate (e.g., calculate) a business data element of interest to the business (e.g., a credit score of a bank customer).

In some embodiments, association module 122 may be configured to facilitate the generation of an association between a derived data lineage and a user-specified data lineage. To this end, association module 122 may generate, for each of one or more business data elements, an association between a business data element and one or more corresponding physical data elements.

In some embodiments, the association module 122 may generate an association between a business data element and one or more corresponding physical data elements automatically (e.g., without user input indicating that the business data element and the physical data elements should be associated). This may be done in any suitable way. For example, in some embodiments, an association between a physical data element and a business data element may be generated automatically, for example, based on metadata of the physical and business data elements. Such metadata may contain information including, but not limited to, names of the physical and/or business data elements, types of the physical and business data elements, relationships between the physical data element and one or more other physical data elements, and relationships between the business data element and one or more other physical data elements. As one specific example, when the physical and business data elements share at least a threshold number of attributes, the association module 122 may associate these elements. As another example, existing associations among data elements may inform the automatic identification of new associations. For example, if a physical data element A (a field in table I storing a credit score for a bank customer) is associated with business data element B (credit score for the bank customer), and data processing system determines (e.g., using a data discovery process) that physical data element A is related to physical data element C (a field in table II storing a copy of the credit score for the bank customer), then association module may associate physical data element C to business data element B.

In some embodiments, association module 122 may generate an association between a physical data element and a business data element may be generated based at least in part (or in whole) on user input specifying the association. In such embodiments, one or more graphical user interfaces may be provided to allow user to specify the association between the physical and business data elements. Illustrative examples of such user interfaces are shown in FIGS. 4A and 4B.

Figure 4A:
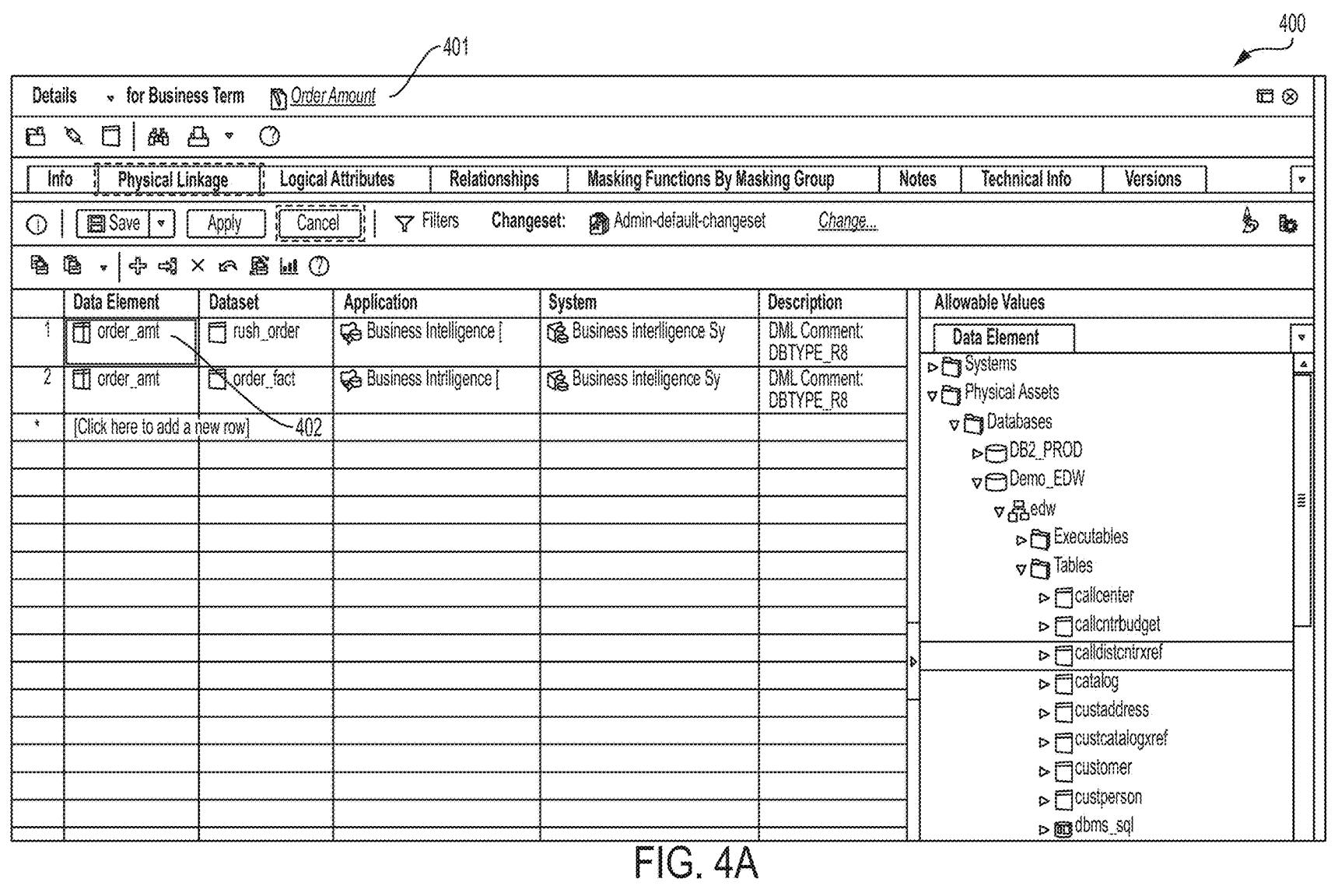

FIG. 4A is a diagram illustrating a graphical interface 400 through which a business data element 401 ("Order Amount") may be associated with two corresponding physical data elements: the physical data element 402 named "order_amt" in dataset "rush_order" and the physical data element 403 also named "order_amt" in dataset "order_fact." The graphical user interface 400 may be used to remove one or both of these associations and/or add one or more other associations. As may be appreciated from the graphical user interface 400, business data element 401 may be associated with one or multiple corresponding physical data elements.

Figure 4B:
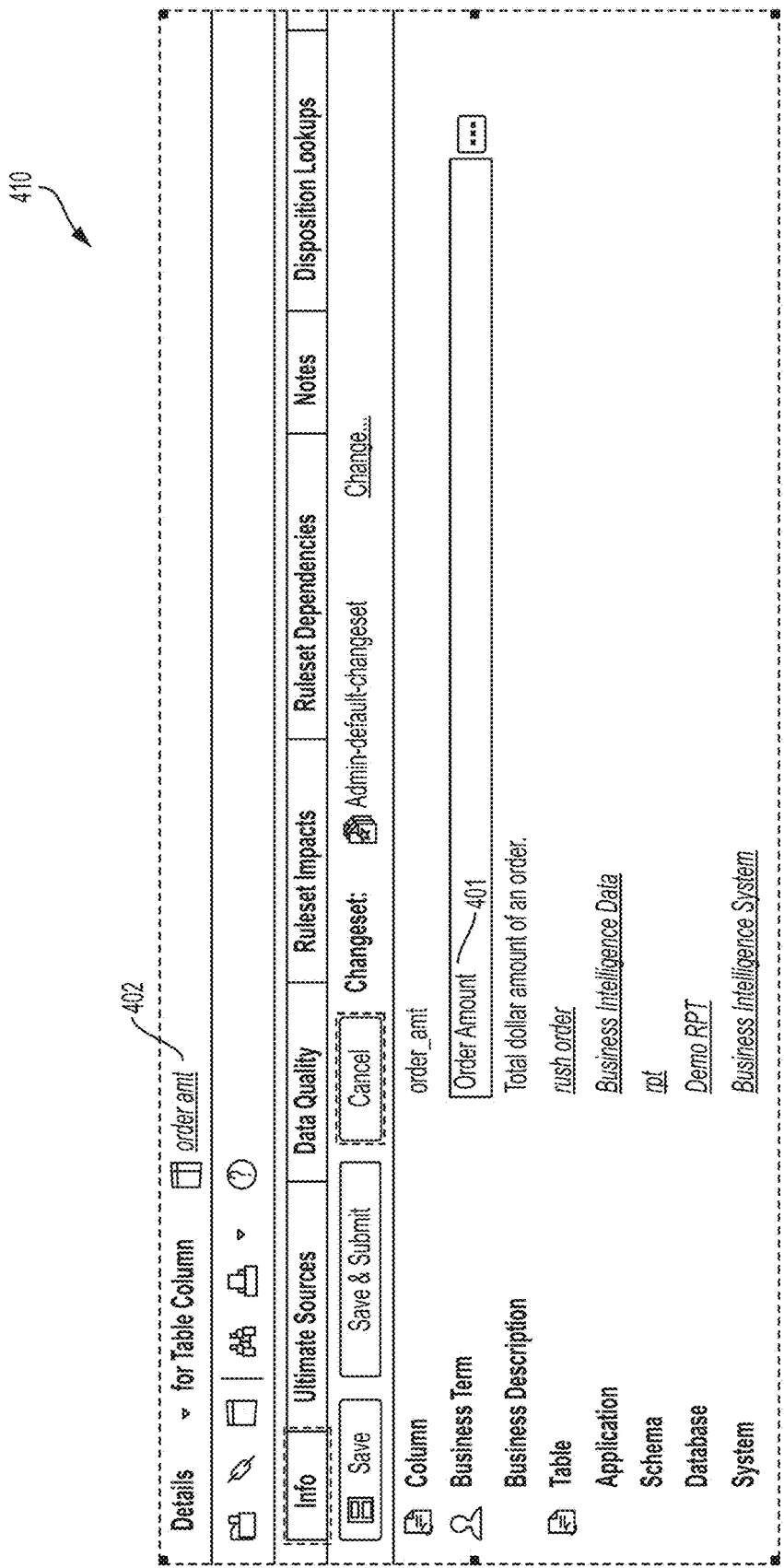
FIG. 4B is a diagram illustrating another graphical interface through which a physical data element may be associated with a business data element, in accordance with some embodiments of the technology described herein.

FIG. 4B is a diagram illustrating another graphical interface 410 through which a physical data element may be associated with a business data element, in accordance with some embodiments of the technology described herein. As shown in FIG. 4B, physical data element 402, in dataset "rush_order" may be associated with business data element 401. As may be appreciated from the graphical user interface 410, physical data element 402 may be associated with a single corresponding business data element.

In some embodiments, data processing system 100 may be configured to show information about data managed by the data processing system to one or more users. In the embodiment illustrated in FIG. 1, data processing system 100 may be configured to show information about data managed by the system to user 130 via computing device 134. The user 130 may view any suitable information, via computing device 134 including, for example, lineage information associated with data managed by system 100. Accordingly, user 130 may view information about a derived data lineage for a physical data element generated by using derived data lineage module 118 (e.g., via any suitable type of data lineage diagram, examples of which are provided herein), information about a user-specified data lineage generated at least in part by using user-specified lineage module 120, and information indicating the association between the derived data lineage and the user-specified data lineage (e.g., as described below with reference to FIGS. 3A-3D).

Each of computing devices 103 and 134 may be any suitable type of computing device, fixed or portable, as aspects of the technology described herein are not limited in this respect. In addition, computing devices 103 and 134 need not be the same type of computing device. Computing devices 103 and 134, data processing system 105 and data store 104 are configured to communicate with one another via network 106. Network 106 may be any suitable type of network such as the Internet, an intranet, a wide area network, a local area network, and/or any other suitable type of network.

As described above, in some embodiments, the association between a derived data lineage and a user-specified data lineage may be used to determine whether there is a discrepancy between these types of lineages. For example, as shown in FIGS. 3A and 3B, the association between a derived data lineage and a user-specified data lineage may be used to determine that the derived and user-specified data lineages indicate different data sources for associated physical and business data elements.

Figure 3A:
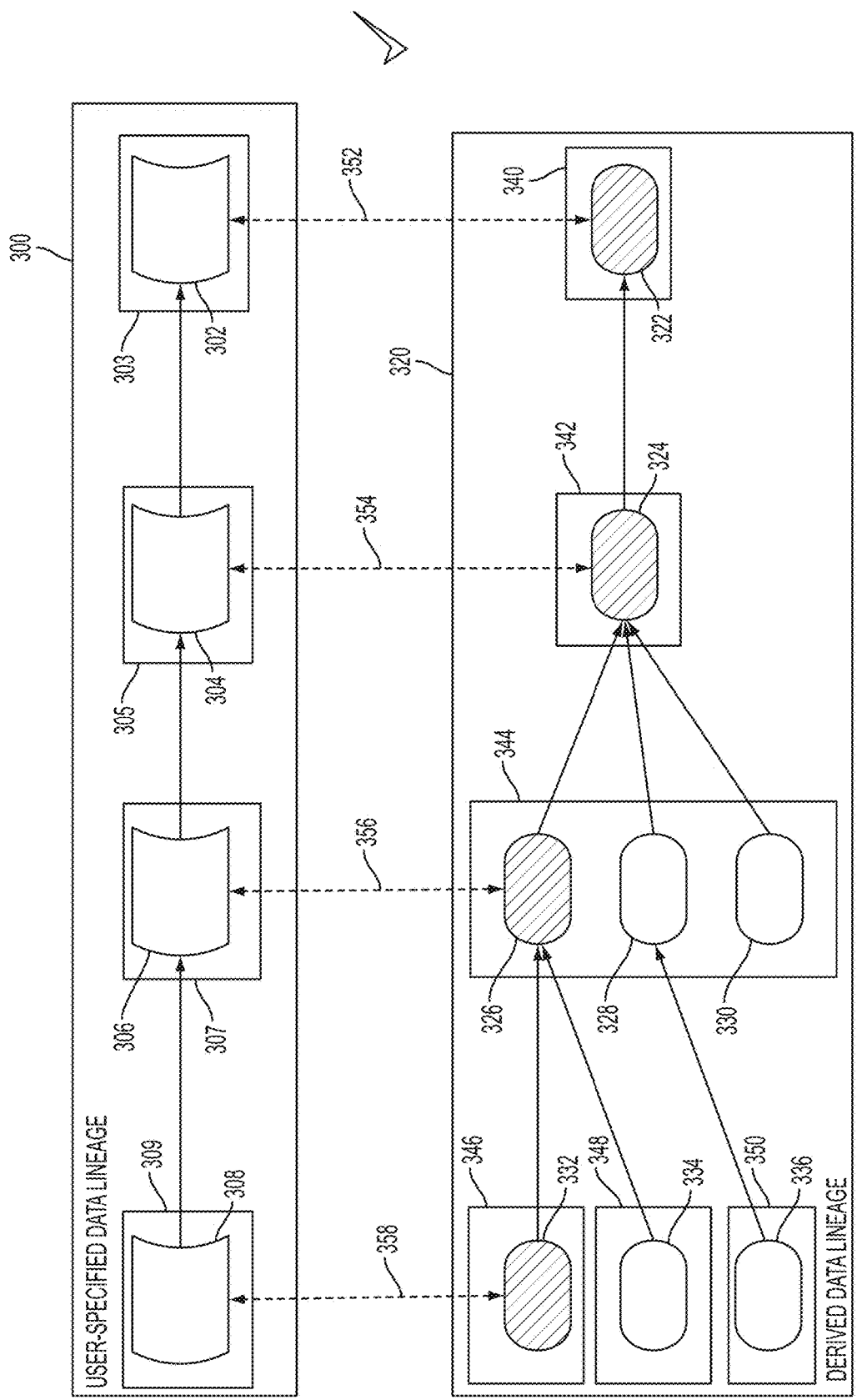
FIG. 3A is a diagram illustrating an association between a user-specified lineage and a derived data lineage, in accordance with some embodiments of the technology described herein.
Figure 3B:
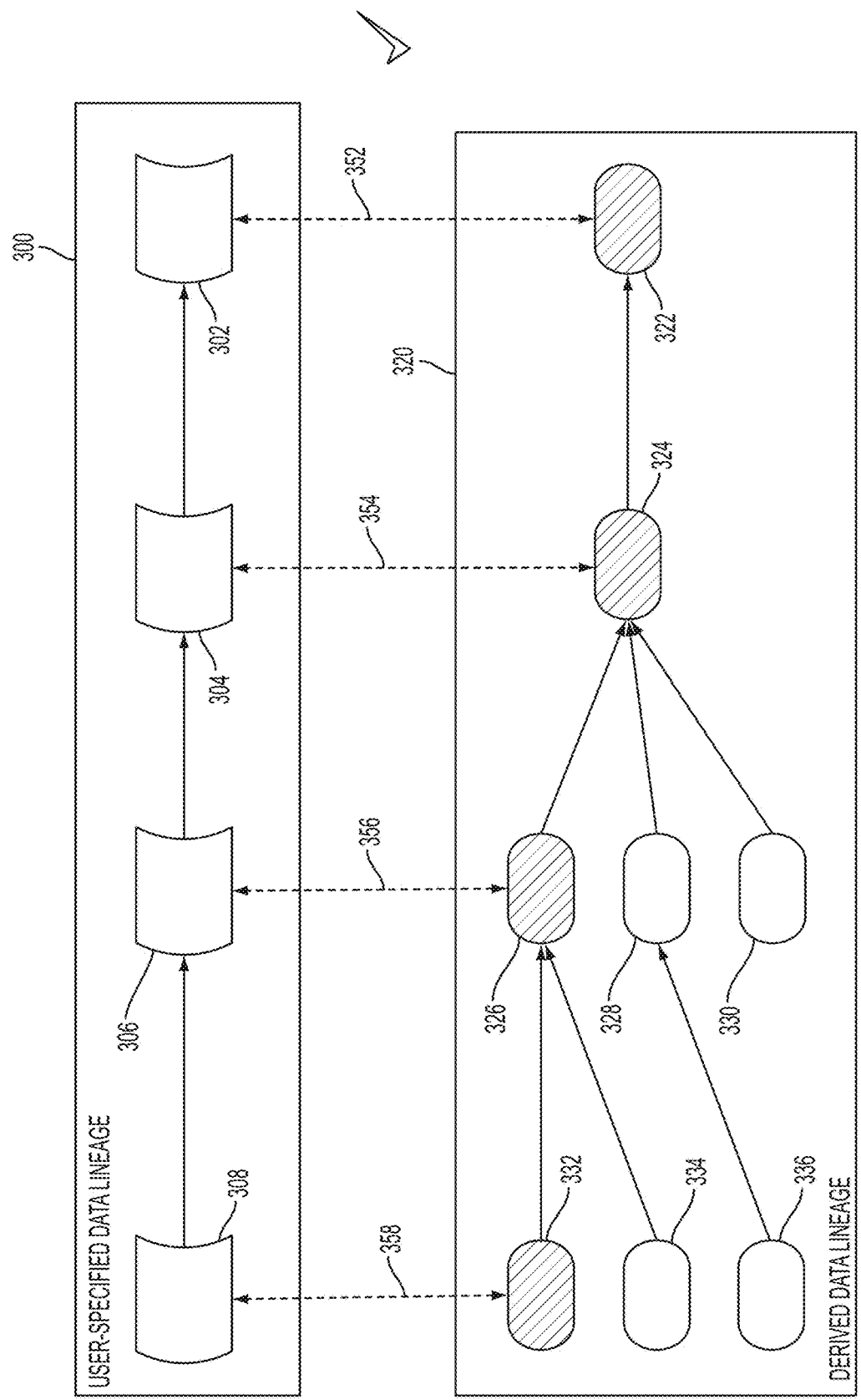
FIG. 3B is another diagram illustrating an association between a user-specified lineage and a derived data lineage, in accordance with some embodiments of the technology described herein.

FIG. 3A is a diagram illustrating an association between an example user-specified lineage 300 and an example derived data lineage 320, in accordance with some embodiments of the technology described herein. Each of user-specified lineage 300 and derived data lineage 320 may be obtained in any of the ways described herein. It should be appreciated that user-specified and derived data lineages may be more complex than the lineages shown in FIG. 3A and, for example, may include many more business data elements, physical data elements, data entities, business data containers, and the like. The examples of lineages shown in FIG. 3A are being used for ease of exposition and not by way of limitation.

Derived data lineage 320 includes data entities 340, 342, 344, 346, 348, and 350. Each of the data entities may be stored in different systems and/or computing devices. Alternatively two or more (or all) of the data entities may be stored in one system and/or computing device. Examples of data entities are provided herein. Each data entity may include one or multiple physical data elements. Data entity 340 contains one or more physical data elements including physical data element 322. Data entity 342 contains one or more physical data elements including physical data element 324. Data entity 344 contains multiple physical data elements including physical data elements 326, 328, and 330. Data entity 346 includes one or more physical data elements including physical data element 332. Data entity 348 includes one or more physical data elements including physical data element 334. Data entity 350 includes one or more physical data elements including physical data element 336.

In some embodiments, a derived data lineage may include upstream data lineage information for one or more physical data elements, which provides information about how the physical data element(s) were obtained and/or generated. For example, in the illustrative example of FIG. 3A, derived data lineage 320 includes upstream data lineage information for physical data element 322. As indicated by the shading shown in FIG. 3A, physical data element 322 was obtained from physical data element 324, which was obtained from multiple physical data elements including physical data element 326, which was obtained from physical data element 332. Accordingly, physical data element 322 was obtained based, at least in part, on physical data element 332 in data entity 346.

User-specified data lineage 320 includes data containers 303, 305, 307, and 309. A data container may be any suitable container for encapsulating a business data element. The data container may be used to present the business data element to a business user. For example, a data container may be a report, a spreadsheet, a presentation having one or more slides, a text file, a Word document, and/or a PDF file. In some embodiments, the content in the data container may be generated by a user, for example, by performing a database query (e.g., a SQL query) and placing the results of the database query into the data container. As a specific non-limiting example, a user creating a user-specified data lineage may perform a database query and insert a table returned as a result of the query into a spreadsheet file.

As shown in FIG. 3A, data container 303 includes one or more business data elements including business data element 302. Data container 305 includes one or more business data elements including business data element 304. Data container 307 includes one or more business data elements including business data element 306. Data container 309 includes one or more business data elements including business data element 308.

In some embodiments, a user-specified data lineage may include upstream data lineage information, which provides information about how the business data element(s) were obtained and/or generated, and/or downstream lineage information for one or more business data elements, which provides information indicating which other business data element(s) depend on the business data element(s). For example, in the illustrative example of FIG. 3A, user specified lineage 300 includes upstream data lineage information for business data element 302. As shown in FIG. 3A, the user-specified lineage 300 indicates that business data element 302 was obtained from business data element 304, which was obtained from business data element 306, which was obtained from business data element 308.

As discussed herein, in some embodiments, an association may be generated between a user-specified lineage and a derived data lineage by generating an association between one or more physical data elements in the derived data lineage and one or more corresponding business data elements in the user-specified data lineage. An illustrative example of such an association is shown in FIG. 3A, which shows that: (1) business data element 302 is associated with physical data element 322 via association link 352; (2) business data element 304 is associated with physical data element 324 via association link 354; (3) business data element 306 is associated with physical data element 326 via association link 356; and (4) business data element 308 is associated with physical data element 332 via association link 358. As may be appreciated from the example of FIG. 3A, an association between a user-specified data lineage and a derived data lineage may comprise information specifying one or more association links between data elements in the lineages. FIG. 3B shows a simplified version of FIG. 3A, with data entities 340, 342, 344, 346, 348, and 350 and data containers 303, 305, 307, and 309 omitted.

In some embodiments, the association between a derived data lineage and a user-specified data lineage may be used to determine whether there is a discrepancy between the lineages. For example, the association shown in FIG. 3A indicates that there is no discrepancy between the user-specified lineage for the business data element 302 and derived data lineage for the physical data element 322, which is associated with the business data element 302. In this example, every physical data element in the upstream derived data lineage of physical data element 322 is associated with a corresponding business data element in the upstream user-specified data lineage for the business data element 302. For example, physical data element 332, which is used to obtain physical data element 322, according to the derived data lineage 320, is associated with business data element 308, which is used to obtain business data element 302, according to the user-specified data lineage 300.

Figure 3C:
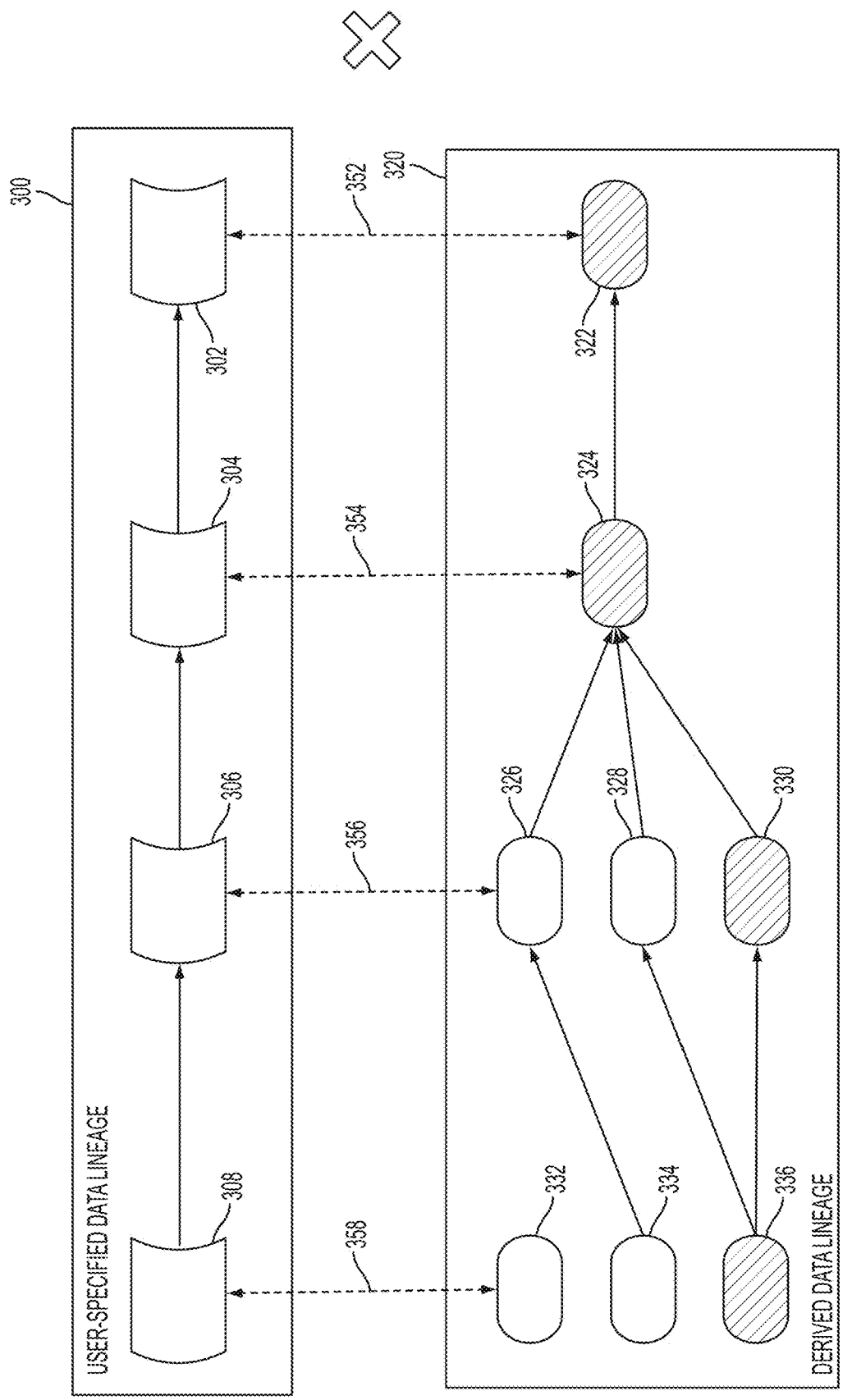
FIG. 3C is another diagram illustrating an association between a user-specified lineage and a derived data lineage, in accordance with some embodiments of the technology described herein.

By contrast, the association shown in FIG. 3C indicates that there is a discrepancy between the user-specified lineage 300 and the derived data lineage 320, which has been updated to reflect changes to the data managed by the underlying data processing system. As a result of the changes to the derived data lineage 320, the physical data element 322 is now obtained by using physical data element 336, as indicated by the shading in FIG. 3C, rather than physical data element 332, as shown in FIG. 3B. As a result, not every physical data element in the upstream derived data lineage of physical data element 322 is associated with a corresponding business data element in the upstream user-specified data lineage for the business data element 302. As shown in FIG. 3C, physical data element 336 which is used to obtain physical data element 322 is not associated with a business data element, in the user-specified data lineage 300, used to obtain business data element 302, which is the business data element associated with physical data element 322. Moreover, although physical data element 332 is not used to generate physical data element 322 according to the derived data lineage, it is nonetheless associated with business data element 308, which is used to generate business data element 302 according to the user-specified data lineage. These discrepancies may be identified automatically using the technology described herein and a user may be alerted to their presence and/or one or more automated actions to resolve the discrepancies may be taken (e.g., by changing the user-specified data lineage and/or notifying one or more users to implement such a change).

As illustrated in FIGS. 3A, 3B, and 3C, in some embodiments, an association between a user-specified data lineage and a derived data lineage includes an association between business data elements in the user-specified data lineage and physical data elements in the derived data lineage. In some embodiments, the association between a user-specified data lineage and a derived data lineage may further include an association between transformations in the user-specified data lineage and the derived data lineage. A transformation in a user-specified data lineage may indicate how a business data element is obtained from one or more other business data elements. A transformation in a derived data lineage may indicate how a physical data element is obtained from one or more other physical data elements. Examples of transformations are provided herein.

Figure 3D:
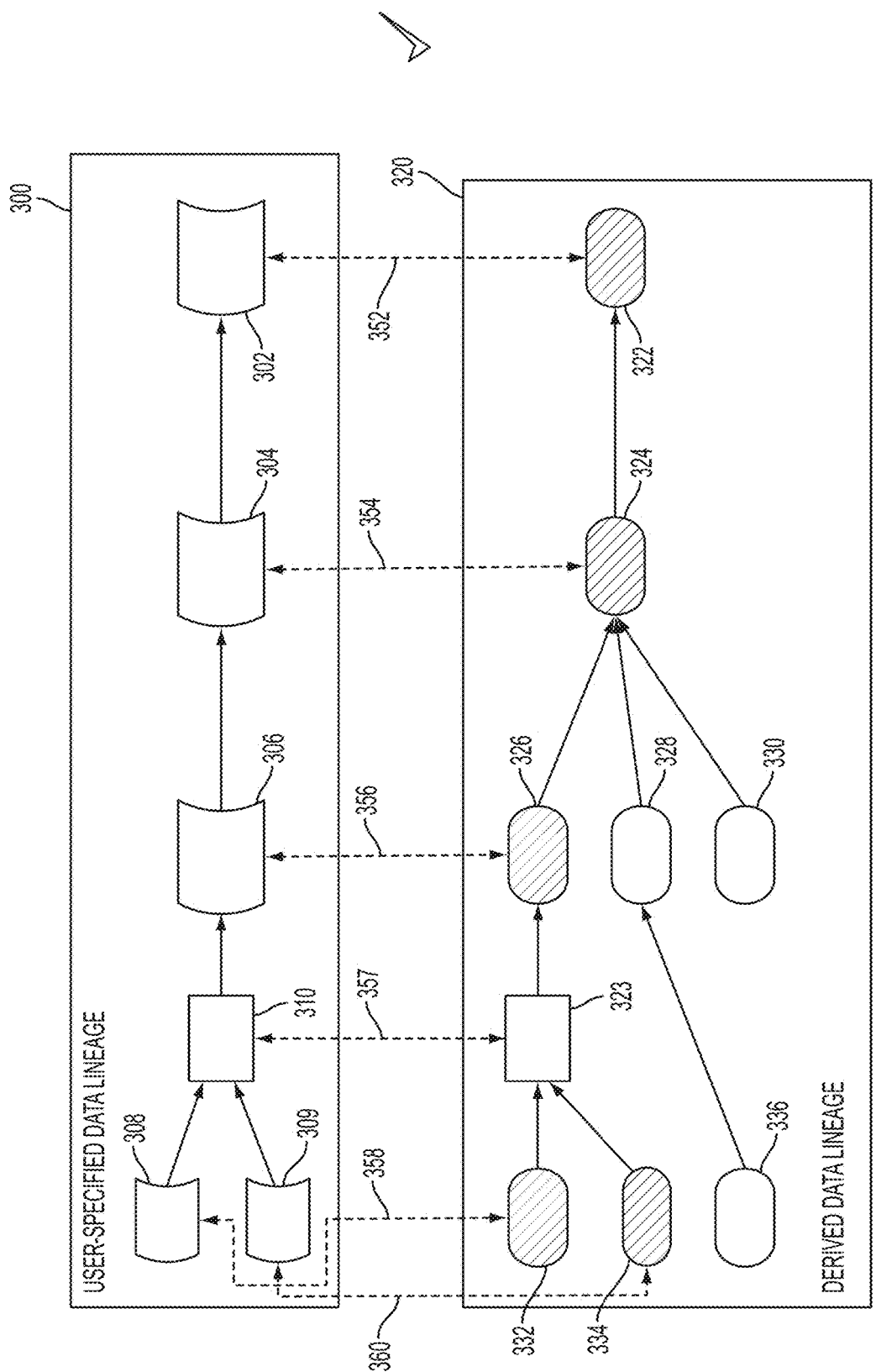
FIG. 3D is another diagram illustrating an association between a user-specified lineage and a derived data lineage, in accordance with some embodiments of the technology described herein.

An example of an association between transformations in user-specified and derived data lineages is shown in the example illustrated in FIG. 3D. In FIG. 3D, user-specified data lineage 300 further includes transformation 310, which is applied to business data elements 308 and 309 to obtain business data element 306. Derived data lineage 320 further includes transformation 323, which is applied to physical data elements 332 and 334 to obtain physical data element 326. As shown in FIG. 3D, the transformations 310 and 323 are associated with one another via association link 357. Although only one transformation is shown in FIG. 3D for each of user-specified data lineage 300 and derived data lineage 320, it should be appreciated that each lineage may include any suitable number of transformations, as aspects of the technology described herein are not limited in this respect. For example, a derived data lineage may include a transformation between linked pairs of data entities and/or physical data entities (see e.g., transformations 204 shown in FIG. 2).

Figure 5:
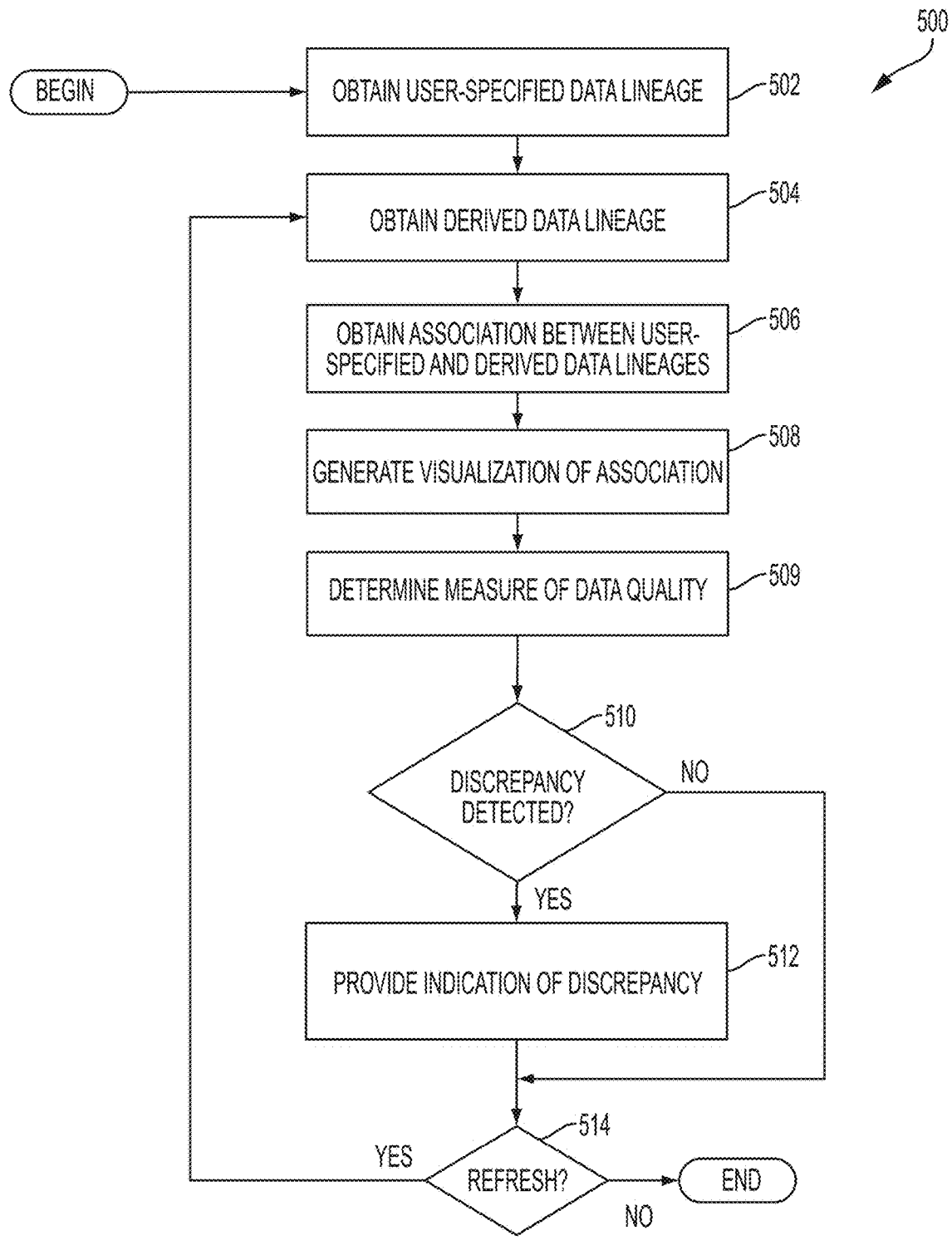
FIG. 5 is a flowchart of an illustrative process for obtaining an association between a user-specified data lineage and a derived data lineage and using the obtained association to determine whether there are any discrepancies among the user-specified data lineage, the derived data lineage, and the association between them, in accordance with some embodiments of the technology described herein.

FIG. 5 is a flowchart of an illustrative process 500 for obtaining (e.g., generating or accessing) an association between a user-specified and a derived lineage and using the obtained association to determine whether there is any discrepancies among the user-specified lineage, the derived lineage, and the association between them, in accordance with some embodiments of the technology described herein. Process 500 may be performed by any suitable system and/or computing device(s) and, for example, may be performed by data processing system 105 described with reference to FIG. 1.

Process 500 begins at act 502, where a user-specified data lineage is obtained. The user-specified data lineage may be obtained in any suitable way. For example, the user-specified data lineage may be specified by a user using one or more graphical user interfaces provided by the data processing system to the user in order to facilitate his/her specifying a user-specified data lineage.

Next, process 500 proceeds to act 504, where a derived data lineage is obtained. The derived data lineage may be obtained in any of the ways described herein. For example, in some embodiments, the derived data lineage may be obtained by analyzing the source code of one or more computer(s) program configured to access at least some of the plurality of physical data elements managed by the data processing system. The source code analysis may be used to identify one or more physical data elements input or accessed by the computer program(s), identify one or more transformations applied to the inputs and/or computations performed using the inputs as part of the computer program(s), and/or identify one or more outputs of the computer program(s). Additionally or alternatively, a derived data lineage may be obtained by analyzing information obtained during runtime of the computer program(s). For example, in some embodiments, one or more logs generated during runtime of a computer program may be analyzed to identify inputs to the computer program, one or more transformations applied to the inputs and/or computations performed using the inputs as part of the computer program, and/or one or more outputs of the computer program.

Next, process 500 proceeds to act 506, where an association between the user-specified lineage obtained at act 502 and the derived data lineage obtained at act 504 is obtained. The association may be obtained by accessing a previously-generated association or by generating the association as part of process 500. Generating an association between a derived data lineage and a user-specified data lineage may comprise generating an association between one or more physical data elements in the derived data lineage and one or more corresponding business data elements in the user-specified data lineage. Additionally, generating an association between a derived data lineage and a user-specified data lineage may comprise generating an association between one or more transformations of physical data elements in the derived data lineage and one or more corresponding transformations of business data elements in the user-specified data lineage. Once generated, the association may be stored in one or multiple data structures by the data processing system so that it is available for subsequent use.

An association between user-specified and derived data lineages may be generated in any of the ways described herein. In some embodiments, an association between the lineages may be generated automatically, for example, based on metadata (e.g., names) of the physical and business data elements. In some embodiments, an association between the lineages may be generated based on user input specifying the association. In such embodiments, one or more graphical user interfaces may be provided by the data processing system to the user to facilitate his/her specifying the association. The graphical user interfaces may facilitate specifying associations between physical and business data elements as well as between transformations being applied to such elements.

Next, process 500 proceeds to act 508, where a visualization is generated of the association generated at act 506. The visualization may provide a graphical indication of which physical data elements and business data elements are associated with one another. Additionally, the visualization may also provide a graphical indication of which transformations in the user-specified lineage and which transformations in the data derived are associated with one another. For example, in some embodiments, the generated visualization may include one or multiple graphical elements representing an association links between one or more physical data elements in the derived data lineage and the associated business data element(s) (e.g., association links 352, 354, 356, and 358 in FIG. 3A). As a specific example, the visualization generated at act 508 may include: (1) a visualization of a first graph representing the derived data lineage obtained at act 504, the first graph including nodes representing data entities, physical data elements, and/or transformations; (2) a visualization of a second graph representing the user-specified data lineage obtained at act 502, the second graph including nodes representing data containers, business data elements, and/or transformations; and (3) one or more edges between nodes in the graphs representing association links between physical and business data elements and/or between transformations in the two lineages. Other non-limiting example visualizations are illustrated in FIGS. 6A-6E and 8A-8F, herein.

Next, process 500 proceeds to act 509, where a measure of data quality is determined each of one or multiple business data elements based on a measure of data quality for each of one or more physical data elements associated with the business data element(s). In some embodiments, a measure of quality for a physical data element may be evaluated using one or more predefined data quality rules, which may define criteria for evaluating the values of physical data elements, such as by identifying characteristics (e.g., accuracy, precision, completeness, and validity) of the values according to the criteria. The extent to which the values exhibit these characteristics may thereby produce a measure of data quality for the physical data elements and, by virtue of the association between the physical and business data elements, a measure of data quality for the business data elements.

Next, process 500 proceeds to decision block 510, where it is determined whether there is a discrepancy among the user-specified data lineage obtained at act 502, the derived data lineage obtained at act 504, and the association obtained at act 506. In some instances, the association between the two types of lineages may be correct and the discrepancy may occur due to a discrepancy between the lineages themselves. In other instances, there may be an error in the association between the two types of lineages and the discrepancy may occur as a result of the error.

The discrepancy may be detected in any suitable way. For example, in some embodiments, the data processing system may check to see whether a physical data element (e.g., physical data element 332 in FIG. 3A), which is used to obtain another physical data element (e.g., physical data element 322 in FIG. 3A) is associated with a business data element (e.g., business data element 308 in FIG. 3A) that is used to obtain a business data element (e.g., business data element 302 in FIG. 3A) that is associated with the other physical data element (e.g., physical data element 322 in FIG. 3A). As another example, the data processing system may determine whether a first set of one or more sources of data identified in the derived data lineage as being used to obtain a physical data element P is different from (or is the same as) a second set of one or more sources of data identified in the user-specified lineage as being used to obtain the business data element B.

When no discrepancy is detected between the user-specified and derived data lineages, process 500 proceeds, via the NO branch, to decision block 514. On the other hand, when there is a discrepancy detected, process 500 proceeds to act 512, where an indication of the discrepancy is provided to a user. The indication may be graphical, textual, or any suitable combination thereof. For example, the indication may be provided as part of a graphical user interface (see e.g., FIG. 6D), a text message, an e-mail, and/or any other suitable form of communication.

At decision block 514, a determination is made as to whether to refresh the derived data lineage obtained at act 504. This determination may be made in any suitable way. For example, in some embodiments, the derived data lineage may be automatically refreshed according to a schedule. In some embodiments, a user may provide input (e.g., in response to a prompt or without being prompted) indicating whether the derived data lineage is to be refreshed. When it is determined that the derived data lineage is to be refreshed, process 500 returns to act 504 via the YES branch. Otherwise, the process 500 completes.

It should be appreciated that process 500 is illustrative and that there are variations of this process. For example, although in the illustrated embodiment, an indication of a discrepancy is provided to a user in response to a discrepancy between the user-specified and derived data lineages being detected, in other embodiments, one or more automated actions may be taken to address the discrepancy. For example, in some embodiments, the derived data lineage may be refreshed in an effort to eliminate the discrepancy. As another example, in some embodiments, the data processing system executing process 500 may change the user-specified data lineage to be consistent with the derived data lineage. As yet another example, the data processing system may use the user-specified data lineage to help it to obtain a new derived data lineage.

As another example of a variation of process 500, it should be appreciated that not all of the acts of process 500 are required in every embodiment. For example, in some embodiments, any one or more of acts 508-514 may be optional. For instance, in some embodiments, process 500 may proceed without performing acts 508 and/or 509.

FIGS. 6A-6E show some additional illustrative examples of graphical user interfaces that may be used in connection with some embodiments of the technology described herein. The graphical user interfaces of FIGS. 6A-6E provide information about the business data element "credit score," which may represent the credit score of a bank customer.

As described herein, a data processing system may maintain information about which parties are accountable for management of a business data element. As an example of this, the illustrative graphical user interface 600 of FIG. 6A, identifies four individuals (including a business owner 602, data steward 604, and two subject matter experts 606 and 608) accountable for management of the "credit score" business data element 601.

Figure 6B:
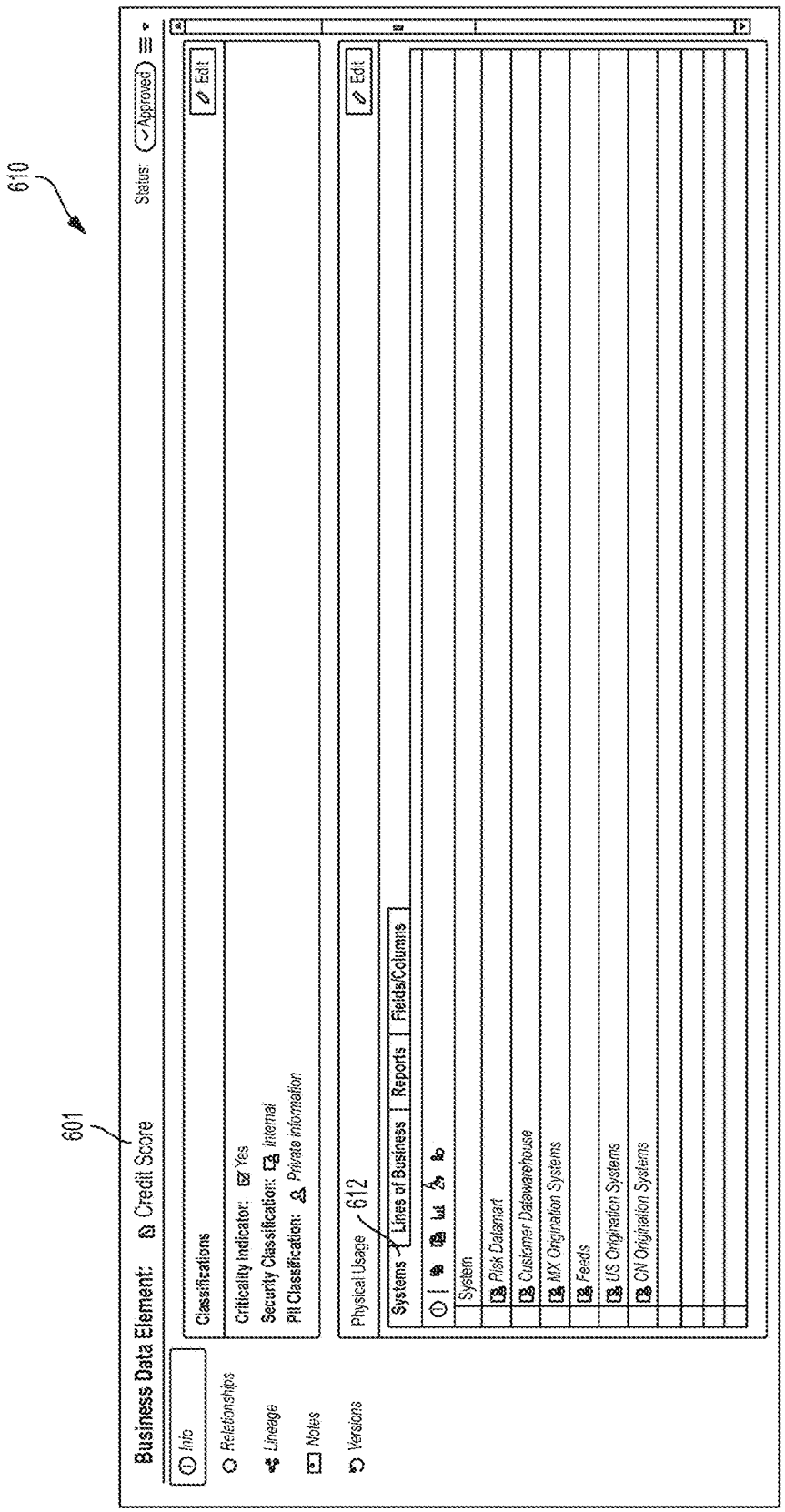
Figure 6C:
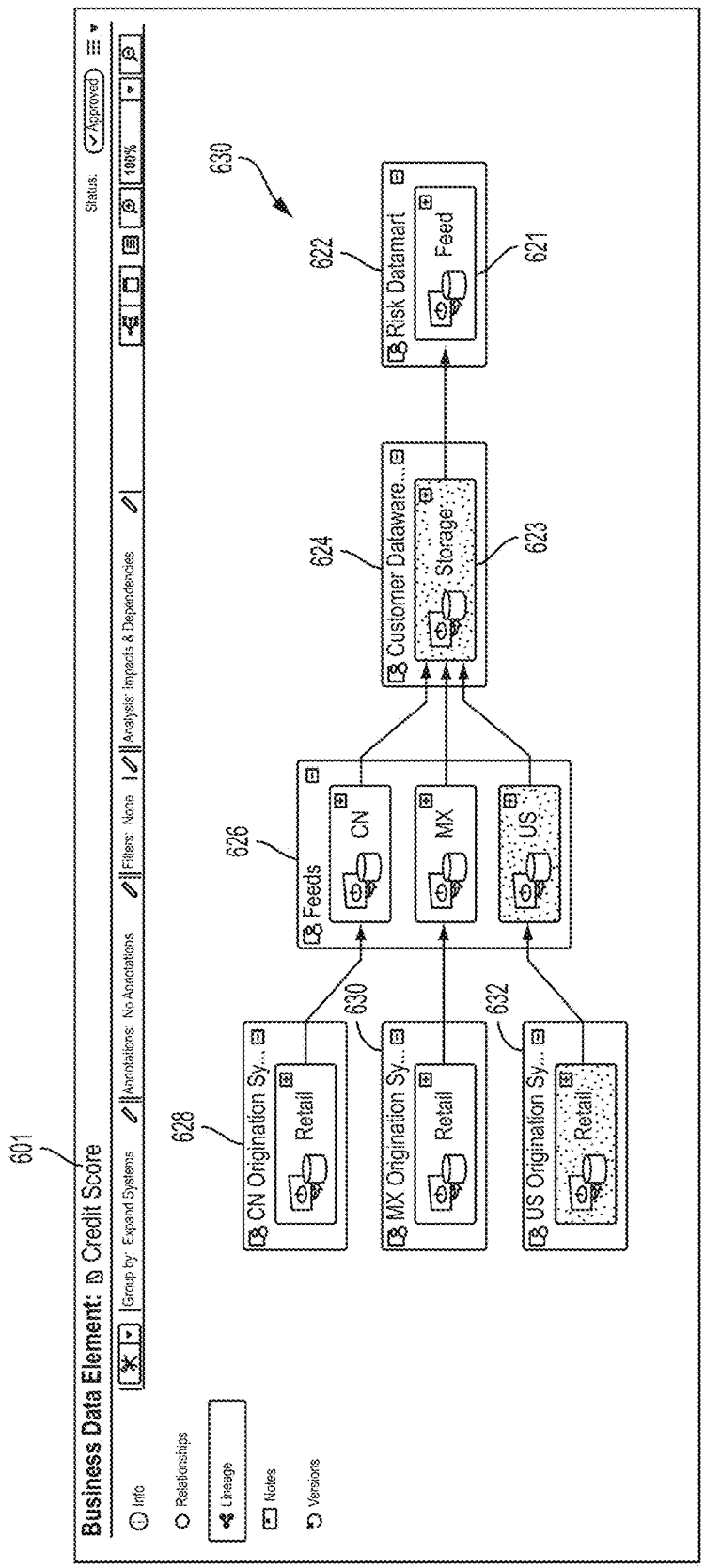
FIG. 6C is diagram of an illustrative user interface presenting a derived data lineage for the business data element "credit score," in accordance with some embodiments of the technology described herein.

FIGS. 6B and 6C provide information about the derived data lineage for the physical data element corresponding to the "credit score" business data element 601. The graphical user interface 610 of FIG. 6B shows a listing 612 of the systems involved in generating the physical data element corresponding to the business data element 601.

FIG. 6C is an illustrative user interface presenting a derived data lineage 630 for the business data element 601 "credit score." As shown in FIG. 6C, the physical data element corresponding to the business data element 601 is stored in feed 621 within risk datamart 622. The physical data elements in feed 621 are obtained using physical data elements stored in storage 623 of customer data warehouse 624. The physical data elements in storage 623 are obtained using physical data elements in feeds 626, which in turn are obtained from physical data elements stored in systems 628, 630, and 632.

Figure 6D:
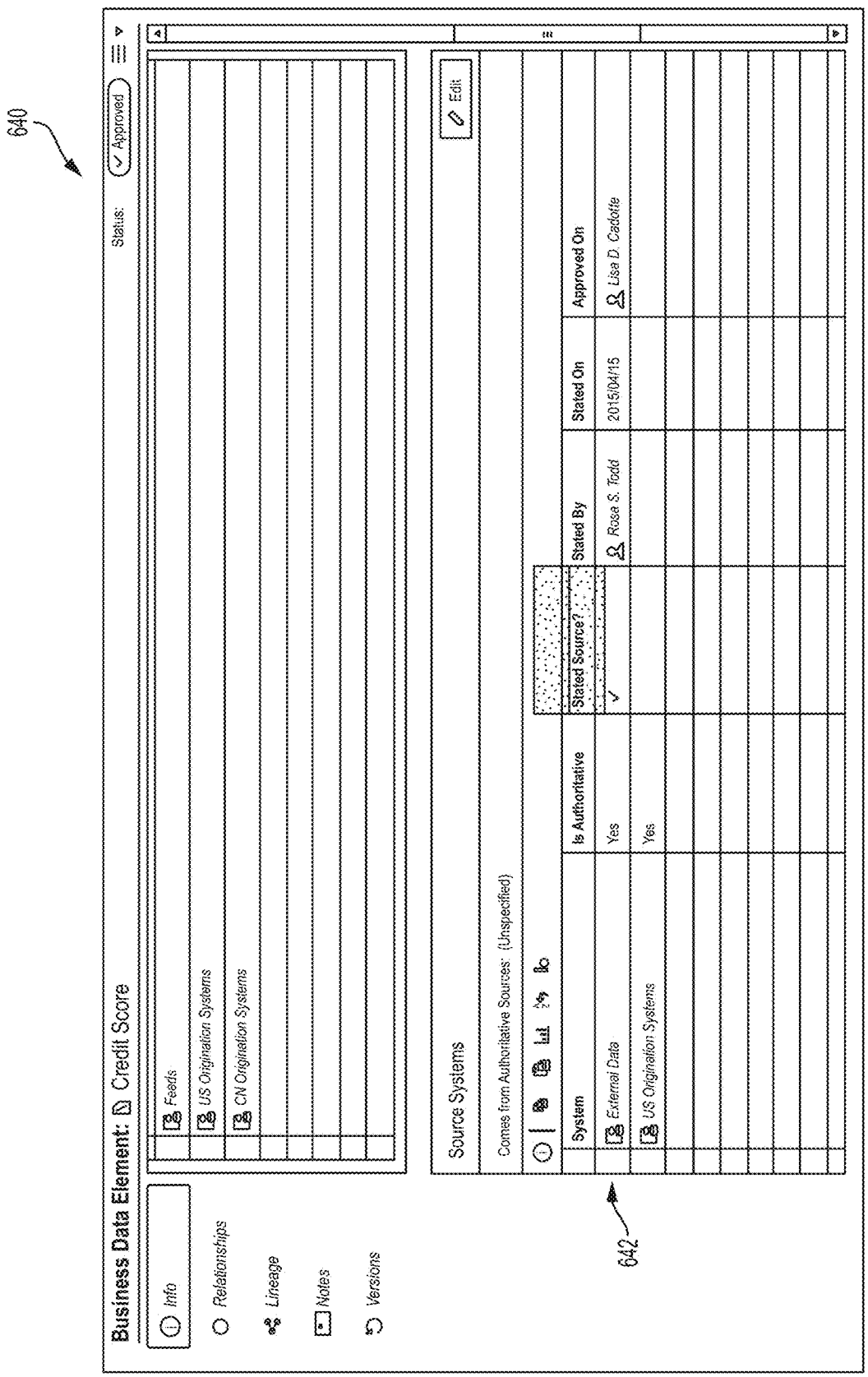
FIG. 6D is a diagram of an illustrative user interface presenting a user-specified data lineage for the business data element "credit score," in accordance with some embodiments of the technology described herein.

FIG. 6D is an illustrative user interface 640 presenting information in the stated data lineage for the business data element 601 "credit score." As shown in the interface, the user-specified ("stated") source of the data used to obtain the physical data element associated with the credit score business data element 601 is "External Data" 642.

FIG. 6E is an illustrative user interface 650 indicating presence of a discrepancy between the user-specified and derived lineages for the business data element 601. As shown in the interface 650, the user-specified ("stated") source of the data used to obtain the physical data element associated with the credit score business data element 601 is "External Data" 652. However, according to the derived data lineage, the source for this physical data element is "U.S. Origination Systems" 654. As can be seen from FIG. 6E, the user interface 650 presents the discrepancy between the user-specified and derived lineages to the user by showing (through checkmarks in boxes) that the stated and derived sources for the physical data element corresponding to business data element 601 do not match.

FIG. 8A is a diagram of an illustrative user interface presenting a user-specified data lineage 800 for the business data element "Total Credit Exposure" contained in the report "Consumer Exposure Report," represented by node 808. The user-specified data lineage 800 indicates, among other thing, the following:

(1) the inputs to the business data element "Total Credit Exposure" are "Credit Score" and "Outstanding Loan Amount," both of which are in a database system called "Risk Datamart," represented by node 806, and are aggregated as inputs to the "Total Credit Exposure" business data element;

(2) the "Credit Score" business data element in the Risk Datamart database has a table column input, in the same database, which goes through a transformation to sort the credit scores into bands;

(3) the "Credit Score" table column in an application called Customer Data Warehouse (CDW), represented by node 804, is a pass through input to the "Credit Score" table column in "Risk Datamart" and is checked by an automatic control called "Credit Score Check" shown by the checkbox along link 805 between nodes 804 and 806; and (4) the contents of the "Credit Score" table column in the CDW application depend on data coming from each of three different originating systems: Canada Origination Systems represented by node 802a, Mexico Origination Systems represented by node 802c, and US Origination Systems represented by node 802d, as well as a third-party application "Credit Bureau Data," represented by node 802b.

As may be appreciated from the foregoing, in user-specified data lineage 800, the various nodes represent different systems, applications, a database, and a report. The links between the nodes represent flows of data, which is why they are sometimes called "flows." In the user-specified data lineage 800, the links 803a-d represent respective flows from nodes 802a-d to node 804, link 805 represents the flow of data from node 804 to node 806, and link 807 represents a flow of data from node 806 to node 808. Note that each of the links in user-specified lineage 800 indicates not only a flow of data between nodes, but also indicates a dependency among the business data elements contained therein. For example, link 803a indicates that the data in "Credit Score" table in the CDW application represented by node 804 depends on the "Credit Score" table in Canada Origination systems represented by node 802a. A link in the user-specified lineage is indicative of a data dependency. A link from business data element A to business element B indicates that business element B depends on business element A.

As shown in FIG. 8A, some of the links are indicated using thick lines (e.g., links 803a, 803c and 803d), some of the links are indicated using dashed lines (e.g., link 803b), and some of the links are indicated using thin lines (e.g., link 807). In some embodiments, a thin line link indicates that the dependency represented by the link in a user-specified lineage has no corresponding dependency (e.g., represented by one or more links) in a derived data lineage. For example, a link between two business data elements may be shown by a thin line when there is no dependency, in the derived data lineage, between two physical data elements corresponding to the two business data elements. As one illustrative example, in FIG. 8F, the dependency GUI element 840 for link 807 shows with a checkmark near the "Stated" field 842 that the dependency represented by link 807 was specified by a user, but the lack of a checkmark near the "Derived" field 842 indicates that there is no corresponding dependency in the derived data lineage associated with the user-specified data lineage. In this way, a thin line link in a user-specified lineage may indicate the presence of a disparity between the user-specified lineage and the associated derived data lineage. Such a disparity may be detected using an association between the user-specified data lineage and a derived data lineage in accordance with the techniques described herein.

In some embodiments, a thick line link indicates that the dependency represented by the link in a user-specified lineage, has a corresponding dependency (e.g., represented by one or more links) in a derived data lineage. For example, a link between two business data elements may be shown by a thick line when there is a corresponding dependency, in the derived data lineage, between two physical data elements corresponding to the two business data elements. As one illustrative example, in FIG. 8B, the dependency GUI element 810 for link 803a shows: (1) with a checkmark near the "Stated" field 812 that the dependency represented by link 803a was specified by a user; and (2) with a checkmark near the "Derived" field 814 that there is a corresponding dependency in the derived data lineage associated with the user-specified data lineage 800. Clicking on GUI element 816 reveals this corresponding dependency between nodes 822 and 824 (through node 824) in the derived data lineage 820 shown in FIG. 8C. In this way, a thick line link in a user-specified lineage may indicate agreement or correspondence between the user-specified lineage and the derived data lineage. Such an agreement or correspondence may be detected using an association between the user-specified data lineage and a derived data lineage in accordance with the techniques described herein.

In some embodiments, a dashed-line link (e.g., link 803a in FIG. 8A) may indicate that the dependency is on data provided by a third-party application.

In some embodiments, a graphical user interface showing a user-specified data lineage may also show one or more control check GUI elements, which may provide credibility for assertions made by a user creating the user-specified lineage. For example, as shown in FIG. 8A, control check GUI elements are represented as circled letters, where the circled V indicates that the node passed the validity control check, and the circled A indicates that the node passed the accuracy control check. Additionally or alternative, a graphical indication that a data quality control check was passed may be provided. Control check GUI elements may apply to both nodes and links/flows. For example, a check box on the link 805 indicates that a check on one or more credit scores was performed.

Figure 8D:
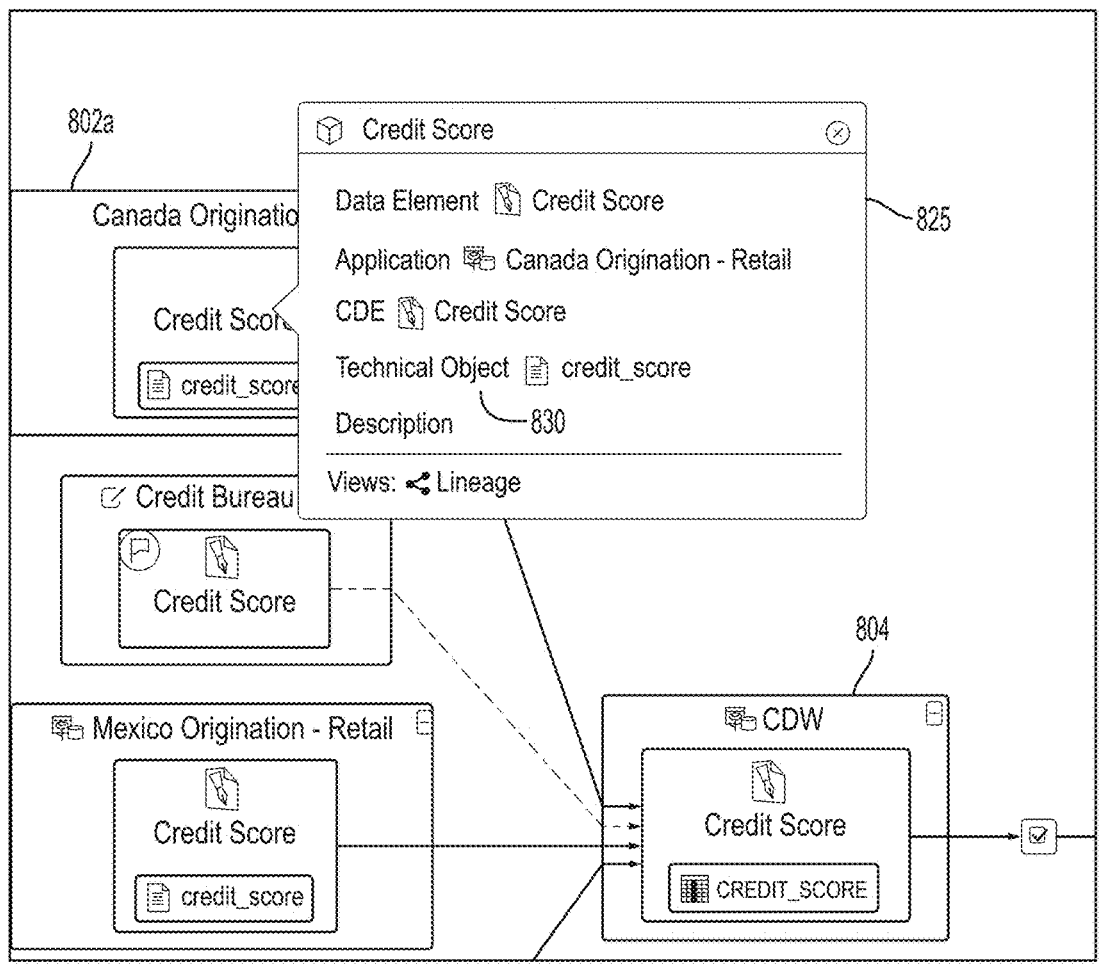
FIG. 8D is a diagram of an illustrative user interface presenting information about a node in the user-specified data lineage of FIG. 8A, in accordance with some embodiments of the technology described herein.
Figure 8E:
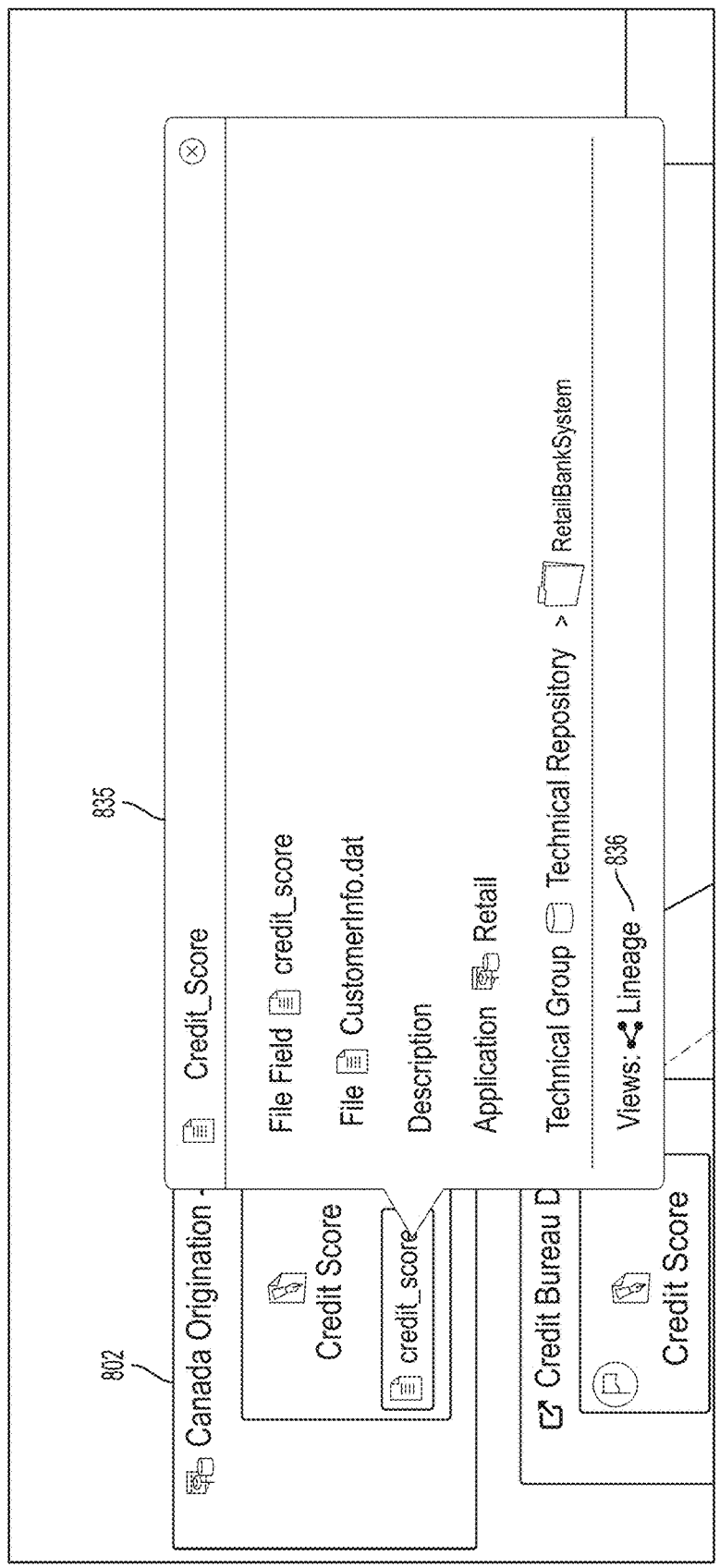
FIG. 8E is a diagram of an illustrative user interface presenting information about a physical data element associated with a business data element in the user-specified data lineage of FIG. 8A.
Figure 8F:
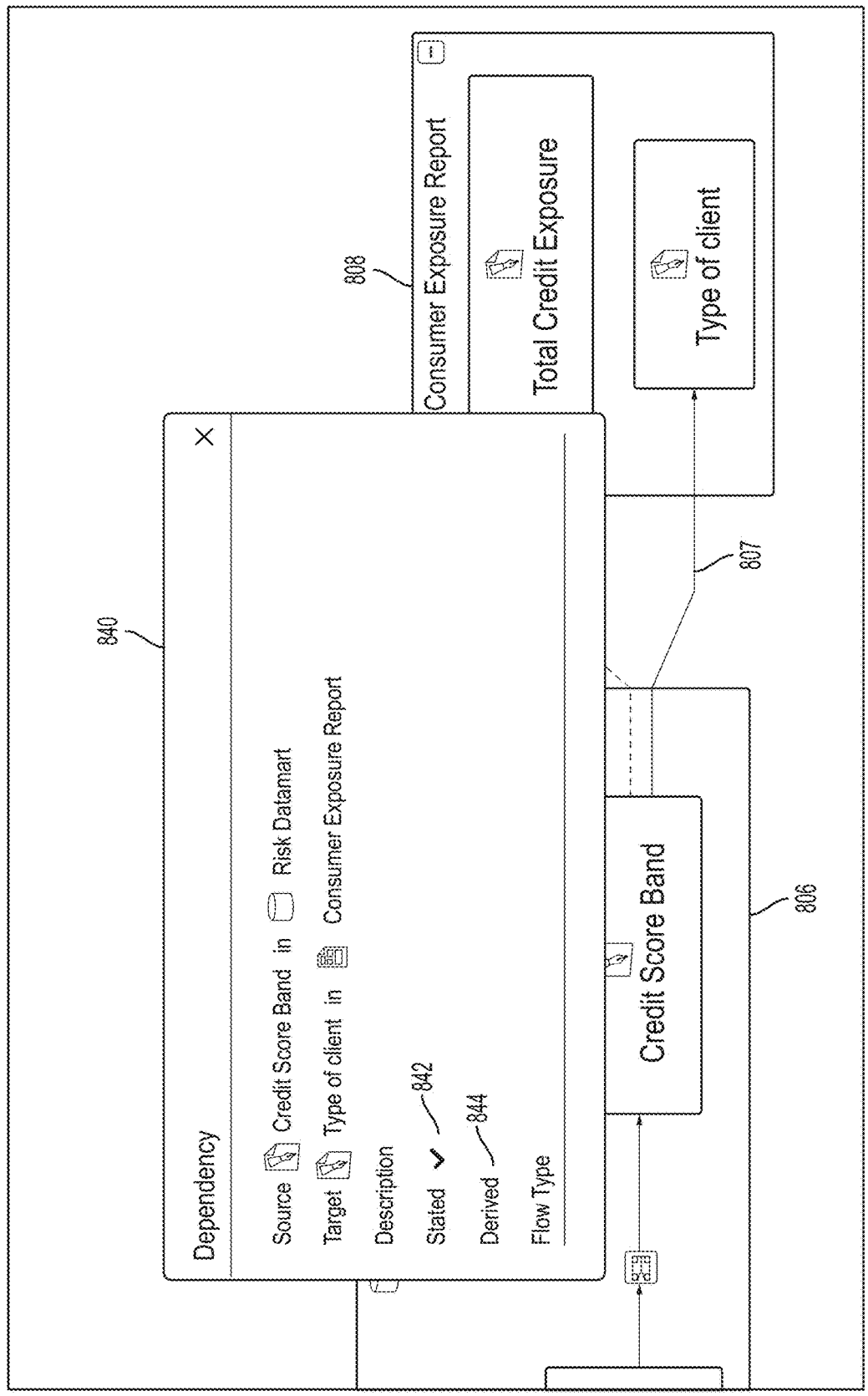
FIG. 8F is a diagram of an illustrative user interface providing details about dependency between two other business data elements in the user-specified data lineage of FIG. 8A, in accordance with some embodiments of the technology described herein.

FIG. 8D is a diagram of an illustrative user interface presenting information about a node in the user-specified data lineage of FIG. 8A, in accordance with some embodiments of the technology described herein. As shown in FIG. 8D, panel 825 is showing additional information associated with business data element "Credit Score" and includes a link to the corresponding physical data element "credit score," the link being indicated by reference numeral 830. This provides another view of the association between the user-specified and derived data lineages. Clicking on the link for physical data element "credit_score" indicated by the reference numeral 830 provides further information about the physical data element, for example, as shown in panel 835 of FIG. 8E. Further clicking on the GUI element 836 shown in FIG. 8E, will show at least a portion of a derived data lineage containing the physical data element "_credit_score".

Figure 7:
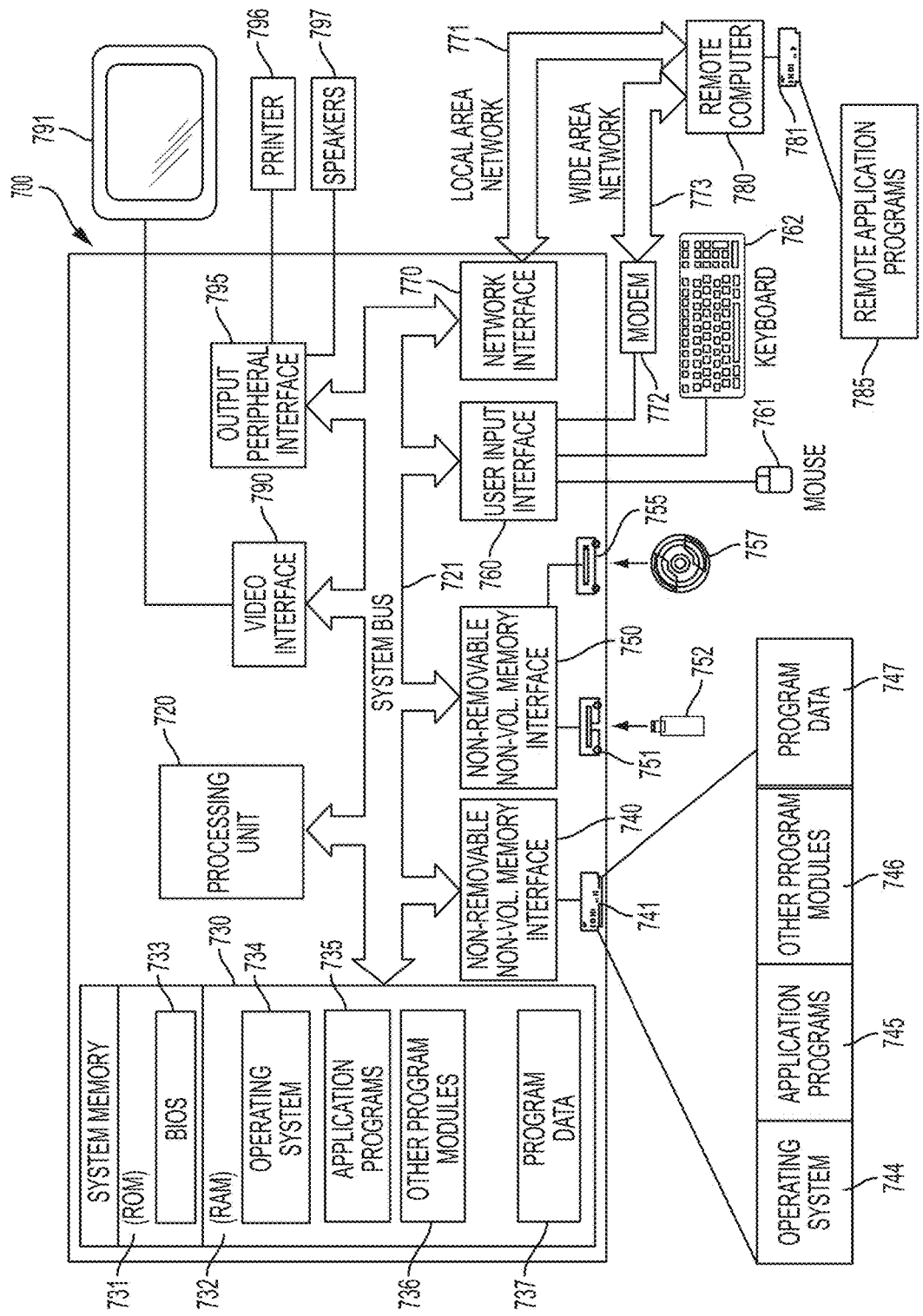
FIG. 7 is a block diagram of an illustrative computing system environment that may be used in implementing some embodiments of the technology described herein.

FIG. 7 illustrates an example of a suitable computing system environment 700 on which the technology described herein may be implemented. The computing system environment 700 is only one example of a suitable computing environment and is not intended to suggest any limitation as to the scope of use or functionality of the technology described herein. Neither should the computing environment 700 be interpreted as having any dependency or requirement relating to any one or combination of components illustrated in the exemplary operating environment 700.

The technology described herein is operational with numerous other general purpose or special purpose computing system environments or configurations. Examples of well-known computing systems, environments, and/or configurations that may be suitable for use with the technology described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The technology described herein may also be practiced in distributed computing environments where tasks are performed by remote processing devices that are linked through a communications network. In a distributed computing environment, program modules may be located in both local and remote computer storage media including memory storage devices.

With reference to FIG. 7, an exemplary system for implementing the technology described herein includes a general purpose computing device in the form of a computer 710. Components of computer 710 may include, but are not limited to, a processing unit 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 710 typically includes a variety of computer readable media. Computer readable media can be any available media that can be accessed by computer 710 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 710. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs 735, other program modules 736, and program data 737.

The computer 710 may also include other removable/non-removable, volatile/nonvolatile computer storage media. By way of example only, FIG. 7 illustrates a hard disk drive 741 that reads from or writes to non-removable, nonvolatile magnetic media, a flash drive 751 that reads from or writes to a removable, nonvolatile memory 752 such as flash memory, and an optical disk drive 755 that reads from or writes to a removable, nonvolatile optical disk 756 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and magnetic disk drive 751 and optical disk drive 755 are typically connected to the system bus 721 by a removable memory interface, such as interface 750.

The drives and their associated computer storage media discussed above and illustrated in FIG. 7, provide storage of computer readable instructions, data structures, program modules and other data for the computer 710. In FIG. 7, for example, hard disk drive 741 is illustrated as storing operating system 744, application programs 745, other program modules 746, and program data 747. Note that these components can either be the same as or different from operating system 734, application programs 735, other program modules 736, and program data 737. Operating system 744, application programs 745, other program modules 746, and program data 747 are given different numbers here to illustrate that, at a minimum, they are different copies. A user may enter commands and information into the computer 710 through input devices such as a keyboard 762 and pointing device 761, commonly referred to as a mouse, trackball or touch pad. Other input devices (not shown) may include a microphone, joystick, game pad, satellite dish, scanner, or the like. These and other input devices are often connected to the processing unit 720 through a user input interface 760 that is coupled to the system bus, but may be connected by other interface and bus structures, such as a parallel port, game port or a universal serial bus (USB). A monitor 791 or other type of display device is also connected to the system bus 721 via an interface, such as a video interface 790. In addition to the monitor, computers may also include other peripheral output devices such as speakers 797 and printer 796, which may be connected through an output peripheral interface 795.

The computer 710 may operate in a networked environment using logical connections to one or more remote computers, such as a remote computer 780. The remote computer 780 may be a personal computer, a server, a router, a network PC, a peer device or other common network node, and typically includes many or all of the elements described above relative to the computer 710, although only a memory storage device 781 has been illustrated in FIG. 7. The logical connections depicted in FIG. 7 include a local area network (LAN) 771 and a wide area network (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the user input interface 760, or other appropriate mechanism. In a networked environment, program modules depicted relative to the computer 710, or portions thereof, may be stored in the remote memory storage device. By way of example, and not limitation, FIG. 7 illustrates remote application programs 785 as residing on memory device 781. It will be appreciated that the network connections shown are exemplary and other means of establishing a communications link between the computers may be used.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. However, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a non-transitory computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A data processing system, comprising:
at least one computer hardware processor; and
at least one non-transitory computer-readable storage medium storing processor-executable instructions that, when executed by the at least one computer hardware processor, cause the at least one computer hardware processor to perform:
obtaining a first data lineage representing relationships among a plurality of physical data elements, the first data lineage being generated at least in part by performing at least one of: (a) analyzing source code of at least one computer program configured to access at least some of the plurality of physical data elements; and (b) analyzing information obtained during runtime of the at least one computer program;
obtaining, based at least in part on user input, a second data lineage representing relationships among a plurality of business data elements;
obtaining an association between at least some of the plurality of physical data elements of the first data lineage and at least some of the plurality of business data elements of the second data lineage; and
generating, based on the association between the plurality of physical data elements and the plurality of business data elements, an indication of agreement or discrepancy between the first data lineage and the second data lineage.

2. The data processing system of claim 1, wherein generating the indication of agreement or discrepancy comprises:
displaying a visualization of the second data lineage showing the indication of agreement or discrepancy.

3. The data processing system of claim 2, wherein the second data lineage comprises a first link representing a first dependency between two business data elements, and wherein displaying the visualization of the second data lineage comprises displaying the link in one manner when there is a dependency in the first data lineage corresponding to the first dependency and in another manner when there is not a dependency in the first data lineage corresponding to the first dependency.

4. The data processing system of claim 2, wherein obtaining the first data lineage comprises analyzing the source code of the at least one computer program.

5. The data processing system of claim 2, wherein obtaining the first data lineage comprises analyzing the information obtained during runtime of the at least one computer program.

6. The data processing system of claim 1, wherein generating the indication of agreement or discrepancy comprises:
determining, based on the association between the plurality of physical data elements and the plurality of business data elements, whether there is one or more discrepancies among the first data lineage, the second data lineage, and the obtained association.

7. The data processing system of claim 6,
wherein the plurality of physical data elements comprises a first physical data element,
wherein the plurality of business data elements comprises a first business data element,
wherein the association indicates that the first physical data element and the first business data element are associated, and
wherein the determining comprises determining that a first set of one or more sources of data identified in the first data lineage as being used to obtain the first physical data element is different from a second set of one or more sources of data identified in the second data lineage as being used to obtain the first business data element.

8. The data processing system of claim 6, wherein acts of obtaining the first data lineage and determining whether there is a discrepancy are performed repeatedly according to a specified schedule.

9. The data processing system of claim 1, wherein obtaining the first data lineage comprises generating the first data lineage at least in part by performing at least one of analyzing the source code of the at least one computer program and analyzing the information obtained during runtime of the at least one computer program.

10. The data processing system of claim 1, wherein the at least one computer program comprises a computer program implemented as a dataflow graph.

11. The data processing system of claim 1, wherein obtaining the association between the at least some of the plurality of physical data elements of the first data lineage and the at least some of the plurality of business data elements of the second data lineage comprises generating the association based on user input provided via a graphical user interface.

12. The data processing system of claim 1, wherein the association comprises an association between a first physical data element of the plurality of physical data elements and a first business data element of the plurality of business data elements, and wherein the at least one computer hardware processor is further configured to perform:
determining, based at least in part on the association between the first physical data element and the first business data element, a measure of data quality for the first business data element.

13. The data processing system of claim 12, wherein determining the measure of data quality for the first business data element comprises:
performing an analysis of data quality of data in the first physical data element based at least in part on one or more data quality rules associated with the data in the first physical data element.

14. The data processing system of claim 12, wherein the measure of data quality for the first business element includes a measure of one or more of accuracy, completeness, and validity.

15. A method, comprising:
using at least one computer hardware processor to perform:
obtaining a first data lineage representing relationships among a plurality of physical data elements, the first data lineage being generated at least in part by performing at least one of: (a) analyzing source code of at least one computer program configured to access at least some of the plurality of physical data elements; and (b) analyzing information obtained during runtime of the at least one computer program;
obtaining, based at least in part on user input, a second data lineage representing relationships among a plurality of business data elements;
obtaining an association between at least some of the plurality of physical data elements of the first data lineage and at least some of the plurality of business data elements of the second data lineage; and
generating, based on the association between the plurality of physical data elements and the plurality of business data elements, an indication of agreement or discrepancy between the first data lineage and the second data lineage.

16. A data processing system for determining a measure of data quality for one or more business data elements, the system comprising:
at least one computer hardware processor; and
at least one non-transitory computer-readable storage medium storing processor executable instructions that, when executed by the at least one computer hardware processor, cause the at least one computer hardware processor to perform:
obtaining a first data lineage representing relationships among a plurality of physical data elements, the first data lineage being generated at least in part by performing at least one of analyzing source code of at least one computer program configured to access at least some of the plurality of physical data elements and analyzing information obtained during runtime of the at least one computer program;
obtaining, based at least in part on user input, a second data lineage representing relationships among a plurality of business data elements;
obtaining an association between at least some of the plurality of physical data elements of the first data lineage and at least some of the plurality of business data elements of the second data lineage, the association including an association between a first physical data element of the plurality of physical data elements and a first business data element of the plurality of business data elements; and determining a measure of data quality for the first business data element based at least in part on at least one data quality measure associated with the first physical data element and the association between the first physical data element and the first business data element.

17. The data processing system of claim 16, wherein determining the measure of data quality for the first business data element comprises:

performing an analysis of data quality of data in the first physical data element based at least in part on one or more data quality rules associated with the data in the first physical data element to obtain the at least one data quality measure associated with the first physical data element.

18. The data processing system of claim 16, wherein the measure of data quality for the first business element includes a measure of one or more of accuracy, completeness, and validity.

19. The data processing system of claim 16, wherein obtaining the first data lineage comprises receiving the first data lineage after it has been generated.

20. The data processing system of claim 16, wherein obtaining the first data lineage comprises generating the first data lineage.

21. The data processing system of claim 20, wherein generating the first data lineage comprises analyzing the source code of the at least one computer program.

22. The data processing system of claim 20, wherein generating the first data lineage comprises and analyzing the information obtained during runtime of the at least one computer program.

23. The data processing system of claim 16, wherein the at least one computer program comprises a computer program implemented as a dataflow graph.

24. The data processing system of claim 16, wherein obtaining the association between the at least some of the plurality of physical data elements of the first data lineage and the at least some of the plurality of business data elements of the second data lineage comprises generating the association between the first physical data element and the first business data element is performed based on user input associating the first physical data element and the first business data element.

25. The data processing system of claim 16, further comprising:

determining, based on the association between the plurality of physical data elements and the plurality of business data elements, whether there is a discrepancy between the first data lineage and the second data lineage.

26. The data processing system of claim 16, wherein acts of obtaining the first data lineage and determining the measure of data quality are performed repeatedly according to a specified schedule.

* * * * *